(12) United States Patent
Vahdat et al.

(10) Patent No.: US 11,615,342 B2
(45) Date of Patent: Mar. 28, 2023

(54) SYSTEMS AND METHODS FOR GENERATING AMPLIFIER GAIN MODELS USING ACTIVE LEARNING

(71) Applicant: HUAWEI TECHNOLOGIES CO., LTD., Guangdong (CN)

(72) Inventors: Ali Vahdat, Montreal (CA); Vahid Partovi Nia, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 581 days.

(21) Appl. No.: 16/540,883

(22) Filed: Aug. 14, 2019

(65) Prior Publication Data

US 2020/0057961 A1 Feb. 20, 2020

Related U.S. Application Data

(60) Provisional application No. 62/764,784, filed on Aug. 16, 2018.

(51) Int. Cl.
| | | |
|---|---|---|
| *G06N 20/00* | (2019.01) | |
| *G06N 5/00* | (2006.01) | |
| *G06N 5/04* | (2006.01) | |
| *G06N 7/00* | (2006.01) | |
| *G06N 20/20* | (2019.01) | |

(52) U.S. Cl.
CPC .......... *G06N 20/00* (2019.01); *G06N 5/003* (2013.01); *G06N 5/04* (2013.01)

(58) Field of Classification Search
CPC .......... G06N 20/00; G06N 5/003; G06N 5/04; G06N 7/005; G06N 20/20
See application file for complete search history.

(56) References Cited

U.S. PATENT DOCUMENTS

| | | | |
|---|---|---|---|
| 2010/0172423 A1 | 7/2010 | Chrabieh | |
| 2012/0269519 A1* | 10/2012 | Jiang | H04J 14/02 398/159 |
| 2018/0005136 A1* | 1/2018 | Gai | G06N 20/00 |

FOREIGN PATENT DOCUMENTS

| | | |
|---|---|---|
| CN | 101635600 A | 1/2010 |
| CN | 105451326 A | 3/2016 |
| CN | 106448684 A | 2/2017 |
| WO | 2016196800 A1 | 12/2016 |

OTHER PUBLICATIONS

C. J. A. Bastos-Filho, E. d. A. Barboza and J. F. Martins-Filho, "Estimating the spectral gain and the noise figure of EDFA using artificial neural networks," 2017 19th International Conference on Transparent Optical Networks (ICTON), 2017, pp. 1-4, doi: 10.1109/ICTON.2017.8024971. (Year: 2017).*

(Continued)

*Primary Examiner* — Luis A Sitiriche
(74) *Attorney, Agent, or Firm* — BCF LLP

(57) ABSTRACT

Methods and systems are described for training a machine learning (ML) model to predict the gain of a target channel of a multi-channel amplifier device. An ML model may be pre-trained using an existing set of training objects. The trained ML model then can be utilized to suggest further useful training objects to be labelled that will improve the performance of the ML model by predicting more accurate target channel gains given the on/off value for the channel inputs.

15 Claims, 18 Drawing Sheets

(56) References Cited

OTHER PUBLICATIONS

Y. Ren, L. Zhang and P. N. Suganthan, "Ensemble Classification and Regression-Recent Developments, Applications and Future Directions [Review Article]," in IEEE Computational Intelligence Magazine, vol. 11, No. 1, pp. 41-53, Feb. 2016, doi: 10.1109/MCI.2015.2471235. (Year: 2016).*
Burr Settles. Active Learning Literature Survey. Computer Sciences Technical Report 1648, University of Wisconsin-Madison. 2009. (Year: 2009).*
J. Li, "Active learning for hyperspectral image classification with a stacked autoencoders based neural network," 2015 7th Workshop on Hyperspectral Image and Signal Processing: Evolution in Remote Sensing (WHISPERS), 2015, pp. 1-4, doi: 10.1109/WHISPERS.2015.8075429. (Year: 2015).*
H. S. Carvalho, I. J. G. Cassimiro, F. H. C. S. Filho, J. R. F. de Oliveira and A. C. Bordonalli, "AGC EDFA transient suppression algorithm assisted by cognitive neural network," 2014 International Telecommunications Symposium (ITS), 2014, pp. 1-5, doi: 10.1109/ITS.2014.6947964. (Year: 2014).*
International Search Report dated Oct. 30, 2019 in corresponding International patent application PCT/CN2019/100716.
Cebron et al., Active learning for object classification: from exploration to exploitation, Data Mining and Knowledge Discovery, Apr. 2009, vol. 18, Issue 2, pp. 283-299.
Cohn et al., Active Learning with Statistical Models, Journal of artificial intelligence research, 1996, vol. 4, pp. 129-145.
Lewis et al., A sequential algorithm for training text classifiers, Proceedings of the 17th annual international ACM SIGIR conference on Research and development in information retrieval. Springer-Verlag New York, Inc., 1994, pp. 3-12.
Osugi et al., Balancing exploration and exploitation: A new algorithm for active machine learning, Data Mining, Fifth IEEE International Conference on Data Mining, IEEE, 2005.
Sharma et al., "Most-surely vs. least-surely uncertain", Data Mining (ICDM), 2013 IEEE 13th International Conference, IEEE, 2013, pp. 667-676.
Ramirez-Loaiza et al., "Anytime active learning", AAAI, 2014, pp. 2048-2054.
Tong et al., "Support vector machine active learning for image retrieval", Proceedings of the ninth ACM international conference on Multimedia, ACM, 2001, pp. 107-118.
Tong et al., "Support vector machine active learning with applications to text classification", Journal of machine learning research, 2001, vol. 2, No. Nov, pp. 45-66.
Baram et al., "Online choice of active learning algorithms", Journal of Machine Learning Research 5, 2004, pp. 255-291.
Nguyen et al., "Active learning using pre-clustering", Proceedings of the twenty-first international conference on Machine learning, ACM, 2004, p. 79.
Donmez et al., "Dual strategy active learning", European Conference on Machine Learning, Springer, 2007, pp. 116-127.
Dasgupta et al., "Hierarchical sampling for active learning", Proceedings of the 25th international conference on Machine learning, ACM, 2008, pp. 208-215.
Huang et al., "Active learning by querying informative and representative examples", Advances in neural information processing systems, 2010, pp. 892-900.
Bondu et al., "Exploration vs. exploitation in active learning: A bayesian approach", Neural Networks (IJCNN), The 2010 International Joint Conference on Data Mining, IEEE, 2010, pp. 1-7.
Hsu et al., "Active learning by learning", AAAI, 2015, pp. 2659-2665.
Chu et al., "Can active learning experience be transferred?", Data Mining (ICDM), 2016 IEEE 16th International Conference on Data Mining, IEEE, 2016, pp. 841-846.
Konyushkova et al., "Learning active learning from data", Advances in Neural Information Processing Systems, 2017, pp. 4228-4238.
Ali et al., "Active learning with model selection", AAAI, 2014, pp. 1673-1679.
Sabharwal et al., "Selecting near-optimal learners via incremental data allocation", AAAI, 2016, pp. 2007-2015.
Gress et al., "Accurate estimation of generalization performance for active learning", Data Mining (ICDM), 2015 IEEE 15th International Conference on Data Mining, IEEE, 2015, pp. 131-140.
Wang et al., "Stability-based stopping criterion for active learning", Data Mining (ICDM), 2014 IEEE 14th International Conference on Data Mining, IEEE, 2014, pp. 1019-1024.
Kale et al., "Accelerating active learning with transfer learning" Data Mining (ICDM), 2013 IEEE 13th International Conference on Data Mining, IEEE, 2013, pp. 1085-1090.
Ramiez-Loaiza et al., "Active learning: an empirical study of common baselines", Data Mining and Knowledge Discovery, vol. 31, No. 2, pp. 287-313, 2017.
Fan et al., "Sure independence screening for ultrahigh dimensional feature space", Journal of the Royal Statistical Society: Series B (Statistical Methodology), 2008, vol. 70, No. 5, pp. 849-911.
Tibshirani, "Regression shrinkage and selection via the lasso", Journal of the Royal Statistical Society. Series B (Methodological), 1996, pp. 267-288.
Donoho et al., "Ideal spatial adaptation by wavelet shrinkage", biometrika, 1994, vol. 81, No. 3, pp. 425-455.
Friedman et al., "Regularization paths for generalized linear models via coordinate descent", Journal of statistical software, 2010, vol. 33, No. 1, p. 1-20.
Fan et al., "Variable selection via nonconcave penalized likelihood and its oracle properties", Journal of the American statistical Association, 2001, vol. 96, No. 456, pp. 1348-1360.
Efron et al., "Least angle regression", The Annals of statistics, 2004, vol. 32, No. 2, pp. 407-499.
Breiman, "Bagging predictors", Machine learning, 1996, vol. 24, No. 2, pp. 123-140.
Lecun et al., "Handwritten digit recognition with a backpropagation network", Advances in neural information processing systems, 1990, pp. 396-404.
Settles, Active learning. Morgan & Claypool Publishers, 2012, vol. 6, No. 1.
Office Action issued in corresponding Chinese patent application No. 201980054185.5 dated Aug. 5, 2021.

* cited by examiner

SYSTEMS AND METHODS FOR GENERATING AMPLIFIER GAIN MODELS USING ACTIVE LEARNING

CROSS-REFERENCE TO RELATED APPLICATIONS

This application claims the benefit of U.S. Provisional Application No. 62/764,784, filed on Aug. 16, 2018.

FIELD OF THE INVENTION

The present invention generally relates to the field of amplifier devices and, in particular, to systems and methods directed to training a machine learning (ML) model for predicting the gain of a target channel of a multi-channel amplifier device.

BACKGROUND

A multi-channel amplifier device may be used to amplify signals, such as electrical or optical signals. The gain of a target channel of the multi-channel amplifier device may comprise a logarithmic difference between the power of an output signal of the output port associated with the channel and the power of an input signal at an input port associated with the same target channel. A model may be constructed to predict the gain of each channel of the multi-channel amplifier device. When signals are added to channels, or removed from channels, it may be useful to predict how the addition or removal of those signals will affect the gain of other channels of the multi-channel amplifier. The model may be used to predict the effects of adding or removing signals from channels.

SUMMARY

The following summary is for illustrative purposes only, and is not intended to limit or constrain the detailed description. The following summary merely presents various described aspects in a simplified form as a prelude to the more detailed description provided below.

A multi-channel amplifier device (hereinafter referred to as amplifier device) may be used to amplify signals, such as electrical or optical signals. For example, Erbium-Doped Fibre Amplifiers, may be used to amplify optical signals sent via optical fibers. The gain of each channel of the amplifier device is affected by the voltage or power of signals not only at the corresponding channel input port, but also at one or more other input ports of the amplifier device. The specific combination of active and inactive channels of the multi-channel amplifier is referred to as an input combination or a channel loading. A model of the gain a target channel of the amplifier device may be used to determine or predict the gain of the target channel, i.e. a selected channel of interest, of the amplifier device. The model of the gain the target channel of the amplifier device may receive as an input the power value (referred to hereinafter as signal strength value) for the input port corresponding to the target channel and the voltage or power value of one or more other input ports of the amplifier device, and the model may output the corresponding predicted gain of the target channel.

The model of the gain a target channel of the amplifier device may be constructed by testing each possible input combination for the amplifier device, and measuring the resulting gain of the target channel of the amplifier device for each possible input combination. The voltage and/or current may be measured for each channel at the input and/or output ports of the amplifier device. The model of the gain may predict the voltage gain and/or current gain of a target channel based on an input combination. The power of the input and/or output signals of each channel may be calculated from the measured voltage and current. The model of the gain may predict the power gain at a channel based on an input combination. An input combination refers to different ways the inputs of an amplifier device can be turned on or off. For example if there are 10 channels on the amplifier device there are $2^{10}$ different possible input combinations, because effectively each input can be either turned on or off (2 possibilities). However, measuring a signal strength (current and/or voltage) at the input port and/or output port of the amplifier device for each possible input combination of the amplifier device in order to determine the gain for the target channel may be time consuming when the amplifier device includes a large number of channels. It may be preferable to learn the model of the gain of a target channel of the amplifier device without measuring the input and output signal strength of the amplifier device for each possible input combination.

A model of the gain of a target channel of the amplifier device (e.g., a selected channel of the amplifier device) may be learned using a machine learning (ML) algorithm which requires many training objects. Each training object may be one or more measured gains in response to a particular input combination. The trainings objects may be in the format of <x,y> pairs, where x is the vector of values for all or a subset of input channels of the amplifier device, i.e. which channels are active and which are inactive, and y is the gain of the target channel when the channel loading of x is applied to the amplifier device. The learned model (referred to hereinafter as a ML model) for a target channel) is used to predict the gain of the target channel given an input combination for the amplifier device. The ML model for the gain of a target channel is a model that maps a given input combination to gain value. The ML model may be used to predict the gain of a channel of the amplifier device given an input combination. In this embodiment, the ML algorithm may use training objects to learn the ML model. In other embodiments, the ML model may be learned, using a neural network (or a decisions tree, or any other ML method,) and training objects. The learned ML model (also referred to as the generated ML model), which is approximated by the neural network or decision tree, may be used to predict the gain of a target channel of the amplifier device given an input combination for the amplifier device.

The training objects may be selected for labeling using various methods. For example the training objects may be selected by an algorithm from a pool of all possible input combinations that have not already been labeled. Random sampling may be used, in which the training objects are randomly selected. An active learning model may be used, in which an initial set of labeled training objects is used to generate the ML model (e.g., the generated ML model), and then additional training objects are selected (by the generated ML model), labeled and used to further improve the generated ML model (e.g., improve the coefficients of the generated ML model). If done properly active learning model is more efficient than performing random sampling.

In certain instances there may be a budget on how many training objects can be labeled and/or a limit on the amount of time that can be used for labeling. It may be preferable to select additional training objects that will provide the most accurate ML model of a target channel of the amplifier device given the budget on training objects and/or labeling time constraint. The additional training objects may be selected by an algorithm from a set of candidate training objects that have not yet been labeled.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
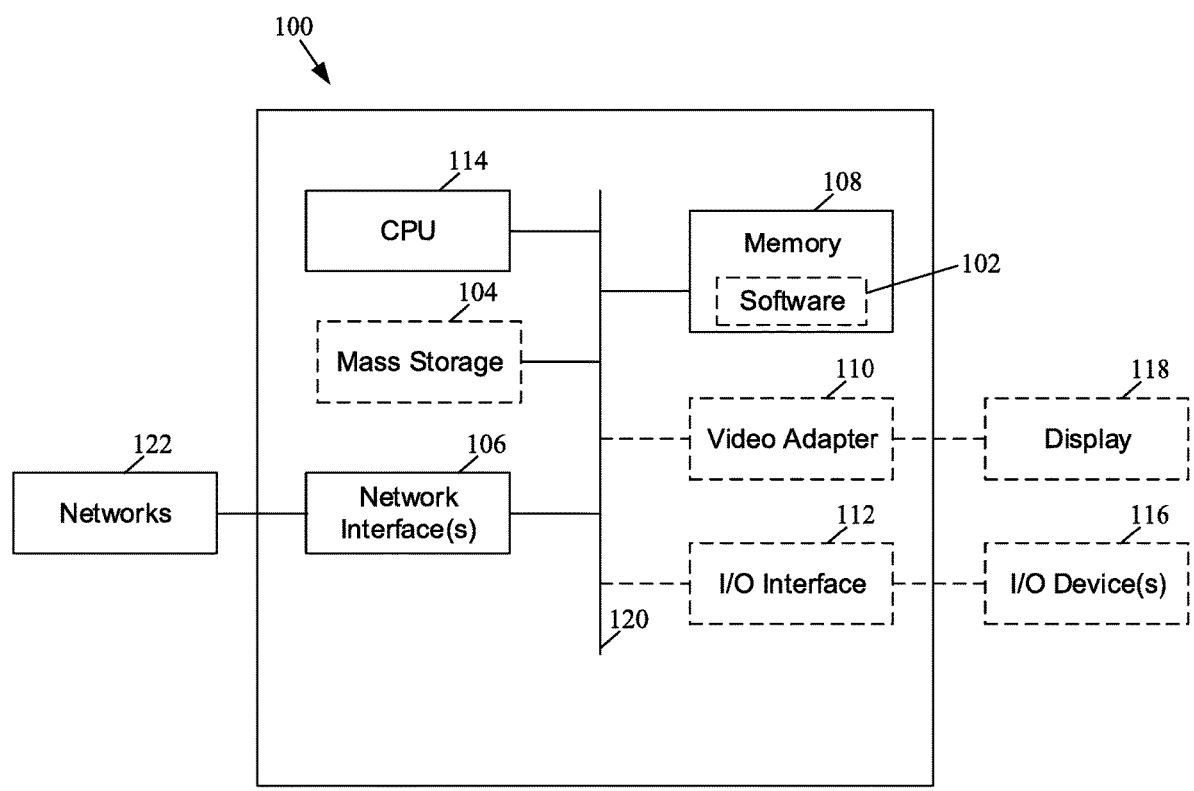
FIG. 1 is a block diagram of a computing system that may be used for implementing devices and methods in accordance with representative embodiments described herein.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

An amplifier device may be used to amplify signals, such as electrical or optical signals. The amplifier device may comprise a repeater, and/or may perform the functions of a repeater. The amplifier device may comprise an optical amplifier and/or repeater, such as an Erbium-doped fiber amplifier (EDFA). For example, an optical amplifier may be coupled to an optical fiber and amplify the power of optical signals sent through the optical fiber, which may be referred to as a link. The amplifier device may comprise a multi-channel amplifier, in which there are multiple input ports and output ports, and each channel has a corresponding input and output port.

A model of the amplifier device may represent various physical attributes of the amplifier device. The model of a gain of a given channel of a multi-channel amplifier may be learned (or generated) using a machine learning (ML) algorithm and a training dataset comprising training objects. The ML algorithm may be a supervised learning ML algorithm, and the training objects may be labeled training objects. The learned or generated ML model may receive an input value for the input port of a given channel and input values for one or more input ports of the other channels of the amplifier device, and output a predicted output (e.g. gain) for the given channel (e.g. target channel) of the amplifier device. The learned or generated ML model may indicate, for the given channel, a logarithmic difference between the signal strength value (e.g. power) of a signal at the input port of the channel and a predicted signal strength value (e.g. power) at the output port of the channel. This logarithmic difference between input and output signal strength values may be referred to as a gain of the channel, or a channel gain.

One "brute force" approach to construct or build a model for the gain of a given channel of the multi-channel amplifier would be to measure an output signal strength value at an output port of the amplifier for the target channel of the amplifier for an input combination, determine a gain for the channel based on ratio of the output signal strength value to the input signal strength value for the given channel, and repeating these steps for all possible input combinations for the given channel. After using this "brute force" approach, a gain value for a given channel of the multi-channel amplifier could be determined by retrieving the corresponding output for the given channel, e.g. using a lookup table, for a specific input combination. However, it may be preferable, such as less time consuming, to learn model of the gain of a given channel of the amplifier device without measuring the input and output signal strength values for every possible input combination for a given channel. In order to model the gain of a given channel of the amplifier without measuring the output signal strength value for the given channel for every possible input combination, various machine learning (ML) algorithms may be used. In some embodiments, the ML algorithm may be used to learn a function.

The ML model of the gain of a channel may be trained by providing a ML algorithm with a set of training objects to learn from. The training of the ML model may result in a ML model (hereinafter referred to as a generated ML model) that may be used to predict a gain value of a target channel of the amplifier, given one or more input values for the amplifier. After generating the ML model, additional training objects may be added to the set of training objects to form an updated set of training objects that may then be provided to the ML algorithm used to further train the generated ML model, thereby generating an improved generated ML model.

The additional training objects may be determined using an active learning process, in which the generated ML model is used to select the additional training objects. Active learning may provide more effective training objects for the generated ML model than randomly selecting training objects. For example, a ML model having a desired accuracy may be trained using 1000 training objects selected using active learning, whereas the ML model learned using random sampling might use 10,000 randomly selected training objects to achieve the same desired accuracy level.

An optical link may be constructed and/or configured to transmit data. The optical link may comprise one or more amplifier devices. One or more ML models may be used in order to improve the performance of the light path setup, improve a signal-to-noise ratio of the link, predict performance of the link, improve network optimization, allocate resources more efficiently, and/or for other purposes.

FIG. 1 is a block diagram of a computing system 100 that may be used for implementing methods in accordance with representative embodiments described herein. Specific computing systems 100 may utilize all of the components shown or only a subset of the components, and levels of integration may vary from computing system 100 to computing system 100. Furthermore, a computing system 100 may contain multiple instances of a component, such as multiple processing units, processors, memories, transmitters, receivers, etc. The computing system 100 may be any type of suitable computing device, such as a physical computer, a server within a data center, or a virtual machine. The computing system 100 may comprise a central processing unit (CPU) 114, a bus 120, and/or memory 108, and may optionally also comprise a mass storage device 104, a video adapter 110, and/or an input/output (I/O) interface 112 (shown in dashed lines). Those skilled in the art will appreciate that the CPU 114 is representative of a processing capability. In some embodiments, in place of the CPU 114, or in addition to the CPU 114 the computing system 100 may include a specialized processing unit. For example, the computing system 100 may include a Graphic Processing Unit (GPU), Tensor Processing Unit (TPU), a Neural Processing Unit (NPU) and/or other so-called accelerated processors (or processing accelerators) may be provided in addition to or in place of the CPU 114.

The memory 108 may comprise any type of non-transitory system memory such as static random access memory (SRAM), dynamic random access memory (DRAM), synchronous DRAM (SDRAM), read-only memory (ROM), or a combination thereof. For example the memory 108 may comprise ROM for use at boot-up, and DRAM for program and data storage for use while executing programs. The bus 120 may be one or more of any type of several bus architectures including a memory bus or memory controller, a peripheral bus, and/or a video bus. The memory 108 may comprise software 102. The software 102 may be retrieved from the memory 108 and executed by the CPU 114 and/or a processing accelerator (not illustrated) such as a GPU, TPU, NPU, etc.

The mass storage 104 may comprise any type of non-transitory storage device configured to store data, programs, and other information and to make the data, programs, and other information accessible via the bus 120. The mass storage 104 may comprise, for example, one or more of a solid state drive, hard disk drive, a magnetic disk drive, and/or an optical disk drive.

The video adapter 110 and the I/O interface 112 may provide interfaces to couple external input and output devices to the computing system 100. Examples of input and output devices comprise a display 118 coupled to the video adapter 110 and an I/O device 116 such as a touch-screen coupled to the I/O interface 112. Other devices may be coupled to the computing system 100, and additional or fewer interfaces may be utilized. For example, a serial interface such as Universal Serial Bus (USB) (not shown) may be used to provide an interface for an external device.

The computing system 100 may also comprise one or more network interfaces 106, which may comprise at least one of wired links, such as an Ethernet cable, and/or wireless links to access one or more networks 122. The network interfaces 106 may allow the computing system 100 to communicate with remote entities via the networks 122. For example, the network interfaces 106 may provide wireless communication via one or more transmitters/transmit antennas and one or more receivers/receive antennas. The computing system 100 may be in communication with a local-area network or a wide-area network for data processing and communications with remote devices, such as other processing units, the Internet, or remote storage facilities.

Figure 2:
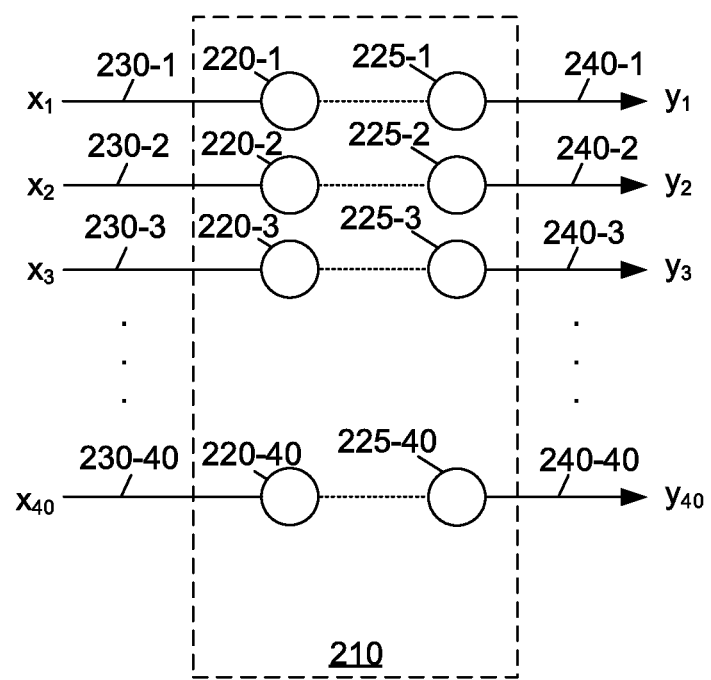
FIG. 2 shows a diagram of an amplifier device according to one or more illustrative aspects of the disclosure.

FIG. 2 shows a diagram of a multi-channel amplifier device 210 (hereinafter referred to as amplifier device 210) according to one or more illustrative aspects of the disclosure. For the purposes of the present example, the amplifier device 210 is an optical amplifier, such as an erbium-doped fiber amplifier (EDFA). In the example embodiment illustrated in FIG. 2, the amplifier device 210 comprises forty (40) channels. The amplifier device 210 may receive one or more signals $x_1$-$x_{40}$ as inputs, and output one or more amplified signals $y_1$-$y_{40}$, as described in further detail below. The input and the amplified output signals are optical signals. Although the multi-channel amplifier device 210 illustrated in FIG. 2 is an optical amplifier, it will be appreciated that in other embodiments, the amplifier device 210 may be another type of amplifier device, such as an electrical amplifier in which the input and the amplified output signals are electrical signals.

The amplifier device 210 comprises forty input ports 220-1-220-40 (generally referred to as input port 220 and collectively referred to as input ports 220) and forty output ports 225-2-225-40 (generally referred to as output port 225 and collectively referred to as output ports 225). Each channel of the amplifier device 210 comprises a pair of input and output ports. For example channel 1 comprises input port 220-1 and an output port 225-1. Each corresponding input port 220-1-220-40 may receive an input signal ($x_1$-$x_{40}$) via one of the corresponding input cables (e.g. optical fibers) 230-1-230-40 (generally referred to as input cable 230 and collectively referred to as input cables 230). Each corresponding output port 225-1-225-40 may output one of the amplified signals via one of the corresponding output cables 240-1-240-40 (generally referred to as output cable 240 and collectively referred to as output cables 240). For each channel of the amplifier device 210, a gain may be calculated. The gain may be calculated by determining the logarithmic difference of a signal strength value of an output signal (e.g. power) at one of the output ports 225 and the signal strength value of the signal (e.g. power) at the corresponding input port of the input ports 220. For example the gain for the third channel of the amplifier comprising the input port 220-3 and the output port 225-3 may be calculated with the following formula $\log(y_3)-\log(x_3)$. The gain of the third channel comprising the input port 220-3 and the output port 225-3 may be referred to as the channel gain for the third channel. For example the difference between $\log(y_{40})$ and $\log(x_{40})$ may be referred to as the gain of channel 40, or the gain across channel 40. The gain for each channel may be measured in decibels (dB). Although the amplifier device 210 is illustrated as having forty channels, an amplifier device 210 may comprise any number of channels, such as 80, 96, etc.

Each channel comprising input ports 220 may be referred to as active or inactive. A predetermined threshold value may be used to determine whether an input port 220 of a channel is active. The signal strength of an input signal received at the input port 220 via the input cable 230 may be measured and compared to the predetermined threshold value to determine whether the input port 220 is active or inactive. A given channel is defined as active when the signal strength at the input port 220 of the given channel is above a threshold value, and defined as inactive when the signal strength at the input port 220 of the given channel is below a threshold value. An active channel may indicate that data is presently being transmitted via the input port corresponding to that channel.

An indication of which channels comprising input ports 220 are active on the amplifier device 210 may be referred to as a channel loading (also referred to as an input combination). For example a channel loading of [1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1] indicates that all odd-numbered channels ($x_1$, $x_3$, $x_5$, ..., $x_{39}$) of the amplifier device 210 are active, and that all even-numbered channels of the amplifier device 210 ($x_2$, $x_4$, $x_6$, ..., $x_{40}$) are inactive. In other words, in this example, all odd-numbered inputs signals have a signal strength value that are above a predetermined threshold, and all the even-numbered signals have a signal strength value that are below the predetermined threshold.

Multiple amplifier devices 210 may be connected to each other, i.e. cascaded, such as at various intervals over a link. The link may comprise a long-haul fiber optic connection. A model for each channel of the cascaded amplifier devices 210 may be used to determine an optical signal-to-noise ratio over the long-haul fiber optic connection.

The gain of each of the channels may be affected by various factors, such as the channel loading of the amplifier device 210, the age of the amplifier device 210, the current temperature of the amplifier device 210, and/or other factors. Differences in manufacturing, or other differences, may cause each individual manufactured amplifier device 210 to provide different gains when other factors, such as temperature and channel loading, are normalized. A model of the gain of one of the channels of the amplifier device 210 may be generated, where the model receives the channel loading of the amplifier device 210 and outputs the gain for the one of the channels. For each manufactured amplifier device 210, it may be preferable to generate a model specific to that amplifier device 210.

Figure 3:
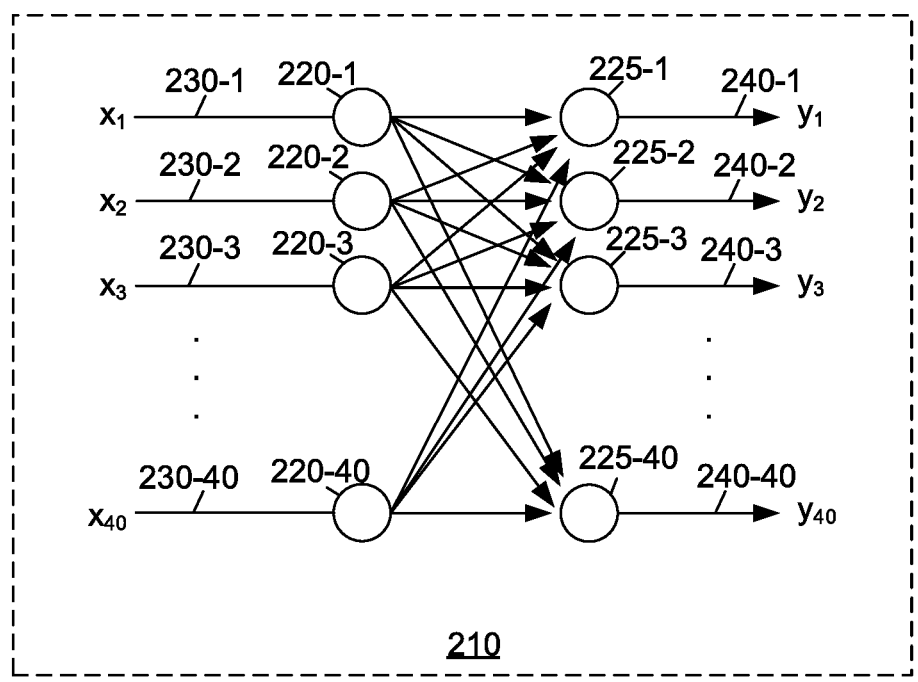
FIG. 3 shows a diagram of interactions between channels of an amplifier device according to one or more illustrative aspects of the disclosure.

FIG. 3 shows a diagram of interactions between channels of the amplifier device 210 according to one or more illustrative aspects of the disclosure. As illustrated in FIG. 3, the gain of a channel may be affected by not only the input signals at the input port 220 corresponding to the same channel, but also the input signals at input ports 220 of all or a subset of other channels of the amplifier device 210. For example, as illustrated, the gain of the first channel comprising input port 220-1 and output port 225-1 may be affected by not only the input signal at the input port 220-1, but also the input signals at input ports 220-2-220-40 of all of the other channels (e.g. input ports (220-2-220-40) of the amplifier device 210.

For each manufactured amplifier device 210, the effect of each input port 220 on the gain of each channel of the amplifier device 210 may be different. For example, for a first amplifier device 210, whether or not the channel comprising input port 220-3 is active or not may have a large effect on the gain of the channel comprising output port 225-2, but for another amplifier device 210 whether or not the channel comprising input port 220-3 is active might have no effect on the gain of the channel comprising output port 225-2. A model may be trained for each channel of a manufactured amplifier device 210 to model the gain of one output port of interest for that specific amplifier device 210.

Figure 4:
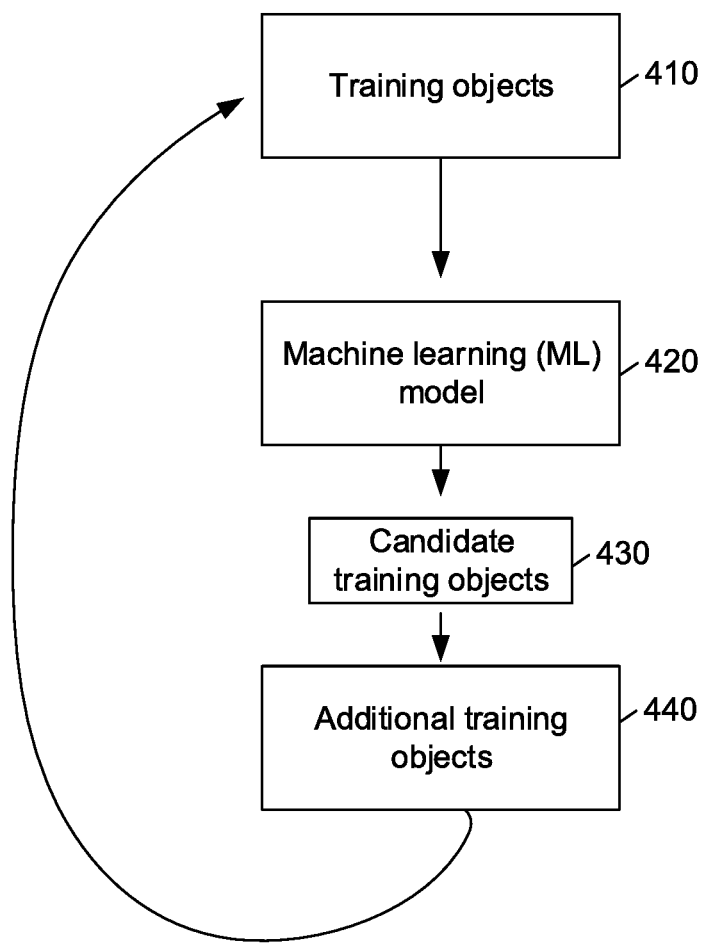
FIG. 4 shows a diagram of training a machine learning (ML) model according to one or more illustrative aspects of the disclosure.

FIG. 4 shows a diagram of a method of generating additional labeled training objects for training a generated ML model of a target channel of the amplifier device 210 according to one or more illustrative aspects of the disclosure. The illustrated method 400 may train a generated ML model of a target channel of the amplifier device, such as the amplifier device 210, by providing a generated ML model 420 with labeled training objects 410 to learn from. The generated ML model may predict the gain of a target channel of the amplifier device 210 given a channel loading (also referred to herein as an input combination. In some embodiments, the generated ML model, when trained using the labeled training objects, may result in an improved generated ML model 420. The improved generated ML model 420 may predict the gain of a target channel of the amplifier device 210 given an input combination (or channel loading) as described in further detail below.

A set of labeled training objects 410 may comprise a set of measured data corresponding to the amplifier device 210. Each labeled training object in the set of training objects 410 may comprise an input value for the input ports 220 of each channel of the amplifier device 210, and a corresponding measured gain of the target channel of the amplifier device 210. For example, for the amplifier device 210 illustrated in FIG. 2, to generated ML model the gain of channel 1, each training object 410 may take the format [$x_1$, $x_2$, ... $x_{40}$] [$y_1$]. The measured gain of a channel is in decibel (dB) units. The signal strength value (e.g. power) may be measured by a device configured to measure the signal strength at the output ports 225 of the amplifier device 210. The signal strength value (e.g. power) may be measured by a technician. Any input signal below a threshold is mapped to −1, and any input signal above the threshold is mapped to 1.

The input values for the labeled training objects may have been converted from continuous input values, such as decibels, into binary values. A threshold value may be selected, and values greater than the threshold value may be set to '1,' and values less than the threshold value may be set to '−1.'

For example, a threshold value of −36 dB may be set, in which case an input value of −23 dB would be represented as '1,' and an input value of −49 dB would be represented as '−1.'

The set of labeled training objects 410 may comprise any number of labeled training objects. The number of labeled training objects included in the set of labeled training objects 410 may be pre-determined. For example five thousand gain measurements may be taken, each with different channel loadings, and the set of labeled training objects 410 may then comprise the five thousand labeled training objects. The number of labeled training objects included in the set of labeled training objects 410 may be determined based on a desired amount of time for collecting the set of labeled training objects 410.

The generated ML model 420 may be trained using the labeled training objects 410 to generate an improved generated ML model for predicting the gain of a target channel of the amplifier device 210 given a channel loading. The generated ML model 420 may receive a channel loading as an input, where the channel loading is a value of active or inactive for all or a portion of the input ports.

In certain embodiments, it may be preferable to further refine the generated ML model 420 after initially training the ML model 420 (e.g., the generated ML model 420). The proposed method can operate in two scenarios; 1) where there is a set of unlabeled candidate training objects 430 (not used for training the generated ML model 420 so far) to choose the additional training objects 440 from, and 2) where there are no unlabeled training objects available. In this scenario the generated ML model 420 is utilized to generate the additional training objects 440. The process of selecting/generating additional training objects is referred to as "active learning". In both scenarios the additional training objects selected/generated by the ML model 420 are sent to lab technicians for labelling (i.e. gain measurement). For each additional training object 440, the label (i.e. gain measurement) is added to the additional training object 440 to generate an additional labeled training object. The additional labeled training objects are then added to the set of labeled training objects 410 for further training the generated ML model 420 to generate an improved generated ML model 420.

The additional training objects 440 may be selected, such as by an algorithm that calculates variance, based on a level of uncertainty of predicted gain output by the ML model. Channel loadings for which the generated ML model 420 has the greatest uncertainty may be selected as additional training objects 440. Variance may be used as a measure of the uncertainty, and channel loadings having the highest variance for the target channel gain may be selected as additional training objects 440. Various methods for selecting additional training objects 440 are described herein.

If unlabeled candidate training objects set 430 exists, the additional training objects 440 are selected from among them. The channel loading corresponding to an unlabeled candidate training object 430 may be applied to the amplifier device 210, and the signal strength at an input port and an output port of a target channel may be measured, such as by a technician. The gain of the target channel is then determined by calculating a ratio of the signal strength value at the output port to the signal strength value at the input channel. The measuring of the signal strengths at an input port and output port of a target channel, the determining of the gain of the target channel given a specific channel loading, and adding the determined gain to the unlabeled candidate training object may be referred to as labeling the unlabeled candidate training object 430. The unlabeled candidate training object 430 may comprise an additional training object 440. One or more additional training objects 440 may be determined. After determining the one or more additional training objects 440, the additional training objects 440 may be labeled and added to the set of training objects 410 previously used to train the generated ML model 420. The generated ML model 420 may be further trained to generate an improved generated ML model 420 (e.g., to further learn the coefficients of the generated ML model 420) using the updated set of labeled training objects 410. The resulting improved ML model 420 may then be used to predict the gain for a target channel of the amplifier device from a channel loading. Iteratively, the generated ML model 420 may be further refined (e.g. further trained to learn the coefficients of the generated ML model 420) by collecting additional training objects 440, labelling the additional training objects 440, and updating the set of labeled training objects 410, and further training the ML model 420 using the updated set of labeled training objects 410.

The number of additional training objects 440 that are selected/generated may be pre-determined, and/or the number of times that additional training objects 440 are collected may be pre-determined. For example, each time the generated ML model 420 is further trained, one hundred additional training objects 440 may be collected, and this process may be repeated ten times, thereby generating, in total, one thousand additional training objects 440 may be labeled and provided to the generated ML model 420 to generate the improved generated ML model 420. The number of additional training objects 440 that are collected and/or the number of times that additional training objects 440 are collected may be determined based on satisfying a threshold, such as a threshold error rate of the generated ML model 420.

Figure 5:
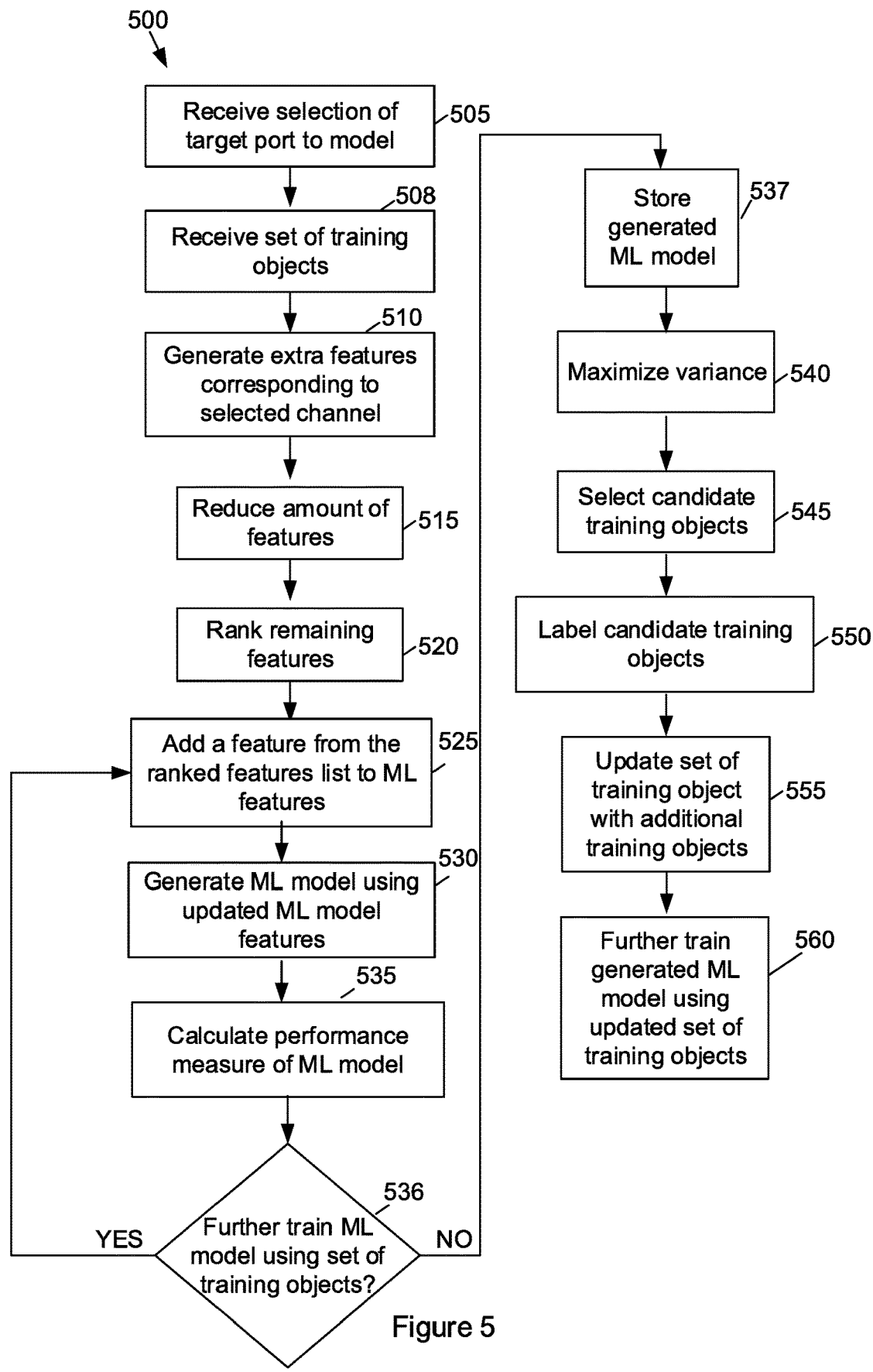
FIG. 5 is a flow diagram of a method for generating an ML model and generating additional labeled training objects for training the generated ML model according to one or more illustrative aspects of the disclosure.

FIG. 5 is a flow diagram of a method 500 for generating a ML model and for generating additional labeled training objects for training the generated ML model 420 according to one or more illustrative aspects of the disclosure. In one or more embodiments, the method 500 or one or more steps thereof may be performed by one or more computing devices or entities. For example, the method 500 may be performed by software executed by the computing system 100. The software includes computer-executable instructions that are stored in a computer-readable medium, such as a non-transitory computer-readable medium. Coding of the software that performs the method 500 is within the scope of a person of ordinary skill in the art having regard to the present disclosure. Some steps or portions of steps of the method 500 illustrated in the flow diagram may be omitted or changed in order. It is to be emphasized, that the method 500 shown in FIG. 5 need not be performed in the exact sequence as shown, unless otherwise indicated; and likewise various steps may be performed in parallel rather than in sequence.

At step 505 a selection of a target channel of an amplifier device 210 may be received. The selection may comprise any channel of the amplifier device 210. Any target channel of interest of the amplifier device 210 may be selected. For example, if the amplifier device 210 comprises 40 channels, and thus any one of the 40 channels of the amplifier device 210 may be selected as the target channel. The selection may be made by a user or automatically, such as in an iterative process where there are multiple target channels of interest. In some embodiments, an algorithm may repeatedly perform the steps 505-536 of the method 500 and iterate through each of the channels of the amplifier 210, resulting in an ML model being learned (e.g. a generated ML model) for each channel of the amplifier device 210.

At step 508 a set of labeled training objects 410 may be received or generated. The number of labeled training objects included in the set of labeled training objects 410 may be predetermined and/or selected by a user.

At step 510 extra features may be generated corresponding to the selected target channel, which may be referred to as "feature generation." The extra features may be generated by an algorithm and/or function. The signal strength value of the input signal at each input port (i.e. channel input) may be referred to as a main effect. For example, in FIG. 2 the main effects of the amplifier device 210 are $x_1$-$x_{40}$. The number of channels of the amplifier device 210 is the same as the number of main effects. For example an amplifier device 210 comprising 40 channels has exactly 40 main effects.

Extra features may comprise features generated based on the main effects. For every main effect $x_i$ and $x_j$, a 2-way interaction (or pair-wise interaction) may be generated $x_i x_j$. For example, up to 780 2-way interactions may be generated for an amplifier device 210 comprising 40 channels. Any combination and amount of extra features may be generated, such as third order interactions or higher. In some instances, only a portion of the extra features may be generated. For example, although up to 780 2-way interactions may be generated for an amplifier device 210 comprising 40 channels, in some instances a smaller number of the 2-way interactions might be generated and/or used for modeling a target channel.

The number of extra features and/or highest order of extra features generated may be selected and/or predetermined. The number of extra features to be generated may be selected or predetermined based on a desired execution time of the method 500. Generating fewer extra features may cause the method 500, or portions of the method 500, to execute more quickly.

Extra features may be generated for each labeled training object included in the set of labeled training objects 410. The generated extra features may be stored with the set of training objects 410, such as in a database or list. In some instances extra features might not be generated, and the database or list may comprise solely the main effects.

Figure 6:
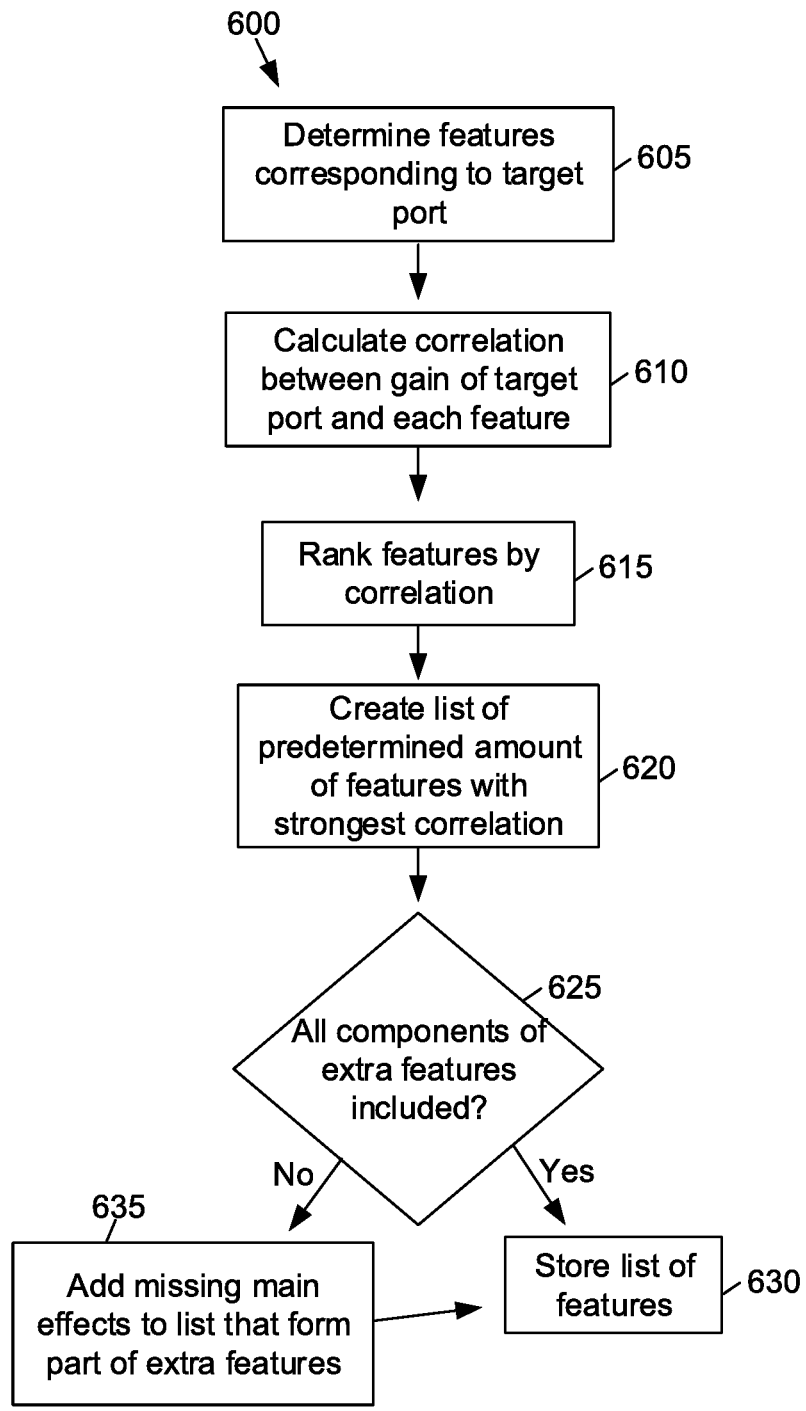
FIG. 6 is a flow diagram of a method for selecting features for generating an ML model according to one or more illustrative aspects of the disclosure.

At step 515 the number of extra features added to each labeled training object in the set of labeled training objects 410 for modeling of the gain of the target channel (e.g. for learning a generated ML model of the gain of the target channel) may be reduced. A feature list comprising main effects and extra features may be created. Each main effect and extra feature in the feature list is referred to hereinafter as a feature. Some of the main effects and/or extra features may have a minimal correlation to the gain of the target channel at step 505. The main effects and extra features which have a minimal correlation to the gain of the target channel may be determined and removed from the feature list at step 515. Various methods may be used to select and remove features (e.g., main effects or extra features) from the feature list at step 515. Method 600, described below and in FIG. 6, is one example of a method that may be used to remove features from the feature list to reduce the number of features included in the feature list at step 515.

Each feature (e.g. main effect or extra feature) included in the feature list may be examined to determine how much that feature (e.g., main effect or extra feature) affects the gain of the target channel. A performance measure may be determined for each of the features included in the feature list. The performance measure may comprise a correlation between the feature and the gain of the target channel. The labeled training objects included in the set of labeled training objects 410 may be used to calculate the performance measure for each feature included in the feature list. Features may then be removed from the feature list based on their performance measure. Features may be removed if their performance measure fails to satisfy a threshold, such as a pre-determined threshold. The features included in the feature list may be ranked based on the performance measure. All or a subset of the features in the feature list may be ranked. A pre-determined number of features may be selected from the ranked features. The selected ranked features may be kept in the feature list and the other features may be removed from the feature list.

Features that were initially removed from the feature list may be added back to the list. If an extra feature, such as a 2-way interaction, is selected but a main effect that is a component of that extra feature has not been selected, the main effect may be added back to the feature list. For example if $x_2 x_{30}$ is included in the feature list, but $x_{30}$ was removed from the feature list, then $x_{30}$ may be added back to the feature list because it forms a component of the selected feature $x_2 x_{30}$.

Some features might not be examined; rather, those features may be kept in the feature list without any examination. The feature corresponding to the target channel (i.e. the main effect for the target channel), and/or features that neighbor the target channel, may be kept in the feature list without examination. For example, if the channel corresponding to channel 28 is selected at step 505, the main effects $x_{28}$, $x_{29}$, and $x_{30}$ may be kept without determining any performance measures for those features. It might be recognized that the input of certain input ports 230, such as the input port 230 corresponding to the target channel and the input ports 230 of neighboring channels, will have a relatively larger effect on the gain of the target channel. Thus it may be more efficient to skip the examination of the effect of those main effects (i.e. input ports) because those main effects would be expected to be kept in the feature list after examination.

At step 520 the features that remain after step 515 may be ranked. In some instances step 515 might not be performed, in which case all of the features will be ranked at step 520. For example, if no extra features were generated at step 510, all of the main effects may be ranked at step 520. A ranking algorithm may be used to rank the features included in the feature list. The ranking algorithm may examine the set of labeled training objects 410 to perform the ranking. Each of the features may be ranked based on a correlation between the target port and that feature. A ranked feature list may be generated that includes each of the ranks and corresponding features. The ranked feature list may include the features from most relevant to least relevant, based on how much each feature affects the gain of the target port according to the ranking algorithm.

Certain features may be ranked at the top of the list without performing the ranking algorithm with respect to that feature. The feature corresponding to the channel of the target port (e.g., the main effect for the target channel), and/or features that neighbor the channel of the target port (e.g., the main effects for the channels neighboring the target port), may be kept without examination and/or ranked at the top of the list. Knowledge about the amplifier device 210 being modeled, and/or other domain knowledge, may be used to determine which features to rank without performing the ranking algorithm on those features. For example if it was previously discovered that the value of a specific feature has a large effect on the output of the target port, that specific feature may be ranked at the top of the list without performing the ranking algorithm on that feature. At step 525 the ML model features used to generate the ML model may be updated by adding a feature from the ranked feature list may to ML model features. The ranked features may be added to the ML model features in order of their ranking. For example, first the ML model may be instructed to generate an ML model 420 using the first four ranked features, and then the ML model may be instructed to generate an ML model based on the first five ranked features, and performance measures computed for each of the two generated ML models may be compared with each other.

At step 530 a ML model may be generated using the updated ML model features. The ML model may be generated by using a pre-determined number of the highest-ranked features from the ranked feature list generated at step 520. For example the ML model may be generated using the four highest-ranked features in the ranked feature list.

The ML model may be trained using the labeled training objects included in the set of labeled training objects 410, which may comprise the labeled training objects received at step 508. The ML model may be trained by providing labeled training objects from the set of labeled training objects 410 to a machine learning algorithm to learn from, such as a least squares algorithm. The training may comprise manual feature selection.

The ML model 420 may comprise one or more of the following: a linear function, quadratic function, a tree-based ensemble model, or any other suitable type of function. The trained ML model 420 may receive a channel loading comprising a binary value for each of the features in the model as an input, and output a predicted gain of the target channel.

At step 535 a performance measure of the ML model may be calculated. The performance measure of the ML model may comprise an indicator of how well the ML model predicts the gain for a target channel for the channel loading associated with each labeled training object included in the set of labeled training objects 410, in other words, the fit of the ML model to the set of labeled training objects 410. The performance measure of the ML model may be measured using an algorithm, such as a Bayesian information criterion (BIC) algorithm, Akaike information criterion (AIC), or Cross Validation (CV).

At step 536 a determination may be made as to whether the ML model is to be trained further.

The determination at step 536 may be made based on the calculated performance measure of the ML model. For example, an amount of error between gain value predicted by the ML model at step 535 and actual gain value, or any other performance measure of the ML model. If the performance measure fails to satisfy a threshold, the method 500 may return to step 525 in order to add another feature from the ranked features list to the list of ML feature used to generate the ML model. If the performance measure satisfies a threshold, the method 500 proceeds to step 537.

At step 537 the generated ML model 420 for the selected channel may be stored. The ML model 420 may be stored in a database. The generated ML model 420 may be transmitted, such as to a server and/or any other device. The generated ML model 420 may be associated with the amplifier device 210. The generated ML model 420 may be associated with other generated ML models 420 for the same amplifier device 210, such as generated ML models 420 for other target output ports (e.g. channels) of the amplifier device 210. The generated ML model 420 may comprise an indication that it is associated with a specific target output port of interest.

At step 540 a variance model may be determined for the generated ML model 420. The variance model may output an amount of variance, or an estimated amount of variance, for each input combination of the generated ML model 420. In other words, for each set of inputs for the generated ML model 420 (main effects and extra features that were used in generating the generated ML model 420), the variance model may output an actual or estimated variance. The amount of variance may indicate an amount of uncertainty, for the output predicted gain of the generated ML model 420, given the combination of inputs.

At step 545 one or more candidate training objects 430 may be selected using the variance model generated at step 540. A maximum value of the variance model may indicate a channel loading (e.g., an input combination) at which the generated ML model 420 has the highest uncertainty in predicted gain of the target output port (e.g., channel) based on that channel loading (e.g., input combination). A candidate training object 430 may be determined based on the channel loading (e.g., input combination) that maximizes the variance model. The candidate training object 430 may comprise the channel loading (e.g., input combination).

The channel loading (e.g. input combination) that maximizes the variance model may comprise input values for all or a portion of the input ports of the amplifier device 210. For example, for the amplifier device 210 which is a 40-channel amplifier device, but the generated ML model 420 stored at step 537 may comprise five features corresponding to particular input values, and thus the variance model may comprise those five features. Acceptable values may be determined for the input ports that are not in the channel loading (e.g., the input combination). The values for these other input ports may be randomly selected, all set to inactive, all set to active, or chosen using any other method.

At step 550, the candidate training objects 430 selected at step 545, which are additional training objects 440, are labeled. The additional training objects 440 may comprise the channel loadings (e.g., the input combinations) of the candidate training objects. Each additional training object 440 is labeled with the determined gain of the target channel, corresponding to the channel loading (e.g., input combination) of the candidate training objects 430.

The selected candidate training objects 430 (which are additional training objects 440) may be labeled by transmitting the selected candidate training objects 430 to a device configured to input values to the amplifier device 210 and measure the gain of the target output port (e.g., channel). A candidate training object 430 may be displayed to a user, and the user may set the input ports of the amplifier device 210 to the values provided in the candidate training object 430. In other words, the user may set all or a subset of the input ports of the amplifier device 210 to be either active or inactive based on a candidate training object 430. The user may measure the signal strength value at the output port of the amplifier device 210 for the channel in order to calculate the channel gain.

At step 555 the set of labeled training objects 410 may be updated to include the additional labeled training objects. At each iteration of step 550, an additional training object $\underline{x}_{1 \times \bar{p}}$ may be selected, and after observing the gain $y(\underline{x})$ of the target channel for the channel loading (e.g., input combination) of the additional training object $\underline{x}_{1 \times \bar{p}}$ and labeling the additional training object $\underline{x}_{1 \times \bar{p}}$, the set of labeled training objects 410 may be updated to include the additional labeled training object. New linear coefficients $\hat{\beta}(\underline{x})$ may be estimated after adding this additional labeled training object to a design matrix $x_{n \times p}$. The new design matrix, after adding the additional labeled training object may be $$\underline{X}_{(n+1) \times p} = \begin{bmatrix} X_{n \times p} \\ \underline{X}_{1 \times p} \end{bmatrix},$$

where X comprises the set of labeled training objects 410, and $\underline{x}$ comprises the additional labeled training object. The marginal and conditional variance may coincide, and may be described as $\mathbb{V}\{\hat{y}(\underline{x})\} = \mathbb{V}\{\hat{y}(\underline{x})|x\}$. To maximize prediction variance $\mathbb{V}\{\hat{y}(\underline{x})|x\}$ the maximizer may be kept scale-invariant. With $\underline{x}$ as a fixed norm to avoid scaling $$\underset{\underline{x}}{argmax} \mathbb{V}\{\underline{x}^T\hat{\beta}\} = \underset{\underline{x}}{argmax} \sigma^2 \underline{x}^T (X^T X)^{-1} \underline{x},$$

where $\sigma^2$ may be a constant. The variance maximizer may be described as $$\hat{\underline{x}} = ce_{min} = \underset{\underline{x}}{argmax} \underline{x}^T (X^T X)^{-1} \underline{x},$$

where $\underline{x}^T\underline{x}=c^2$, and where $e_{min}$ may be an eigenvector associated with a smallest eigenvalue of $X^TX$. Where the feature space is binary, $\vec{x} \in \{-1, +1\}^p$, then a relaxed approximation may be $\hat{\underline{x}} = \text{sign}(e_{min})$.

The method 500 may continue at step 560, and the updated set of labeled training objects 410 may be used to further train the generated ML model 420 and generate an improved generated ML model 420. Although not illustrated in FIG. 5, the method 500 may continue from step 540 to step 560, and the variance may be maximized, taking into account the additional labeled training object. The method 500 may select whether to return to step 540 based on a counter. For example, after every 10 additional labeled training objects have been added to the set of labeled training objects 410, a further improved generated ML model 420 may be generated (e.g, the coefficients of the generated ML model may be further improved).

FIG. 6 is a flow diagram of a method 600 for selecting features for generating an ML model according to one or more illustrative aspects of the disclosure. In one or more embodiments, the method 600 or one or more steps thereof may be performed by one or more computing devices or entities. For example, the method 600 may be performed by software executed by a processing unit the computing system 100. The software includes computer-executable instructions that are stored in a computer-readable medium, such as a non-transitory computer-readable medium. Coding of the software that performs the method 500 is within the scope of a person of ordinary skill in the art having regard to the present disclosure. Some steps or portions of steps of the method 600 shown in the flow diagram may be omitted or changed in order. It is to be emphasized, that the method 600 shown in FIG. 6 need not be performed in the exact sequence as shown, unless otherwise indicated; and likewise various steps may be performed in parallel rather than in sequence.

At step 605 features corresponding to a selected target port or target channel may be determined. Any combination of primary features and/or extra features may be determined. Actions performed at step 605 may be similar to those described above at step 510. Data corresponding to the features may be calculated for each training object 410 and may be stored with the training objects 410.

At step 610 a correlation between the gain of the target port or target channel and each feature may be calculated. The training objects 410 may be used to determine the correlation between the gain of the target port or target channel and each feature. The correlation may be calculated as a Pearson correlation and/or any other type of correlation function.

At step 615 the features may be ranked based on the strength of their correlation to the gain of the target port or target channel. At step 620 a list may be created with a number of highest-ranked features. The number of highest-ranked features in the list may be pre-determined and/or selected. For example the list may comprise the twenty highest-ranked features, which have the strongest correlation to the gain of the target port or target channel. The number of highest-ranked features may be determined based on a threshold correlation strength. All features that satisfy the threshold correlation strength may be included in the list.

At step 625 the list may be scanned to determine whether all components of extra features are included. The extra features may comprise pairwise interactions, such as $x_i x_j$. For example if $x_3 x_7$ is included in the list of features, the list may be scanned to determine whether $x_3$ is present in the list and/or whether $x_7$ is present in the list.

If all main effects of the extra features are not included in the feature list, the missing main effects, may be added to the list at step 635. If all main effects of extra features are included in the list, the list of features may be stored at step 630.

At step 635 all or a portion of the missing main effects may be added to the list of features. As described above in regard to step 515 of FIG. 5, main effects may be added to the list of features if the main effects form a portion of an extra feature in the list.

The list of features may be stored at step 630. For example the list of features may be stored in a database. The list of features may be transmitted to another function or algorithm. The list of features may be ranked, such as by using the ranking method 700 described below.

Figure 7:
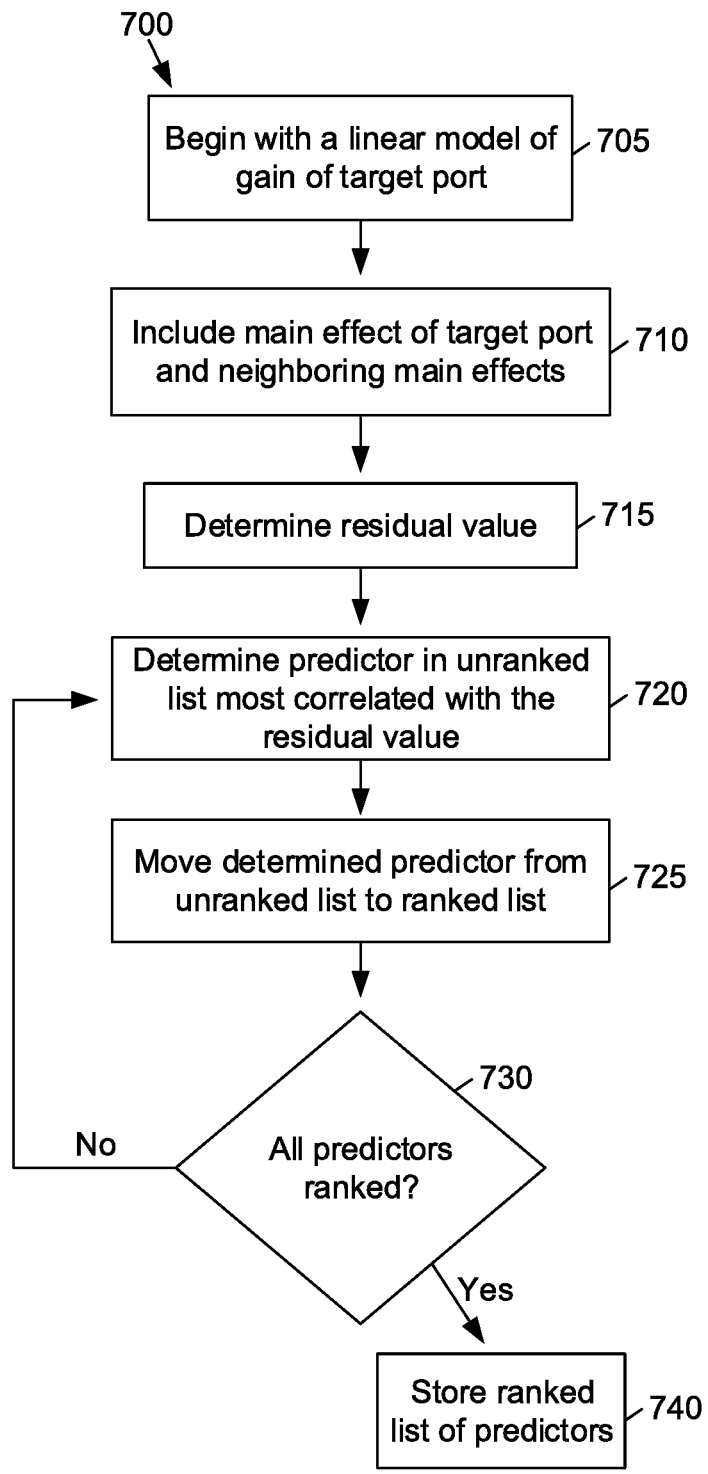
FIG. 7 is a flow diagram of a method for ranking features according to one or more illustrative aspects of the disclosure.

FIG. 7 is a flow diagram of a method 700 for ranking features according to one or more illustrative aspects of the disclosure. In one or more embodiments, the method 700 or one or more steps thereof may be performed by one or more computing devices or entities. For example, the method 700 may be carried out by software executed by a processing unit of the computing system 100. Coding of the software that performs the method 700 is within the scope of a person of ordinary skill in the art having regard to the present disclosure. The software includes computer-executable code or instructions that are stored in a computer-readable medium, such as a non-transitory computer-readable medium. Some steps or portions of steps in the flow diagram may be omitted or changed in order. It is to be emphasized, that the method 700 shown in FIG. 7 need not be performed in the exact sequence as shown, unless otherwise indicated; and likewise various steps may be performed in parallel rather than in sequence.

At step 705 a linear ML model 420 is generated to predict a gain of a selected target channel given an input combination. The ML model 420 may be a linear model that comprises main effects from a list of features, such as a list of features generated using the method 600. An example of a linear model that comprises 40 main effects is $\widehat{y_{ch}} = b_0 + b_1 x_1 + b_2 x_2 + \ldots + b_{40} x_{40}$, where $\widehat{y_{ch}}$ comprises the estimated predicted gain for channel ch corresponding to the target channel given a channel loading (otherwise referred to as an input combination). Each value of b comprises a coefficient, and each value of x comprises a main effect.

At step 710 main effects corresponding to the target channel and neighboring ports may be placed in a ranked list of features. The feature corresponding to the target port may comprise a feature corresponding to the input port associated with the same channel as the target port. The neighboring ports may comprise one or more ports that neighbor the input port. Features corresponding to the other input ports may be placed in an unranked list of features. The coefficients of the input port for the target port and the neighboring input ports in the linear model may be set to a predetermined value. For example, in the example linear model given above, the coefficients $b_{ch-1}$, $b_{ch}$, and $b_{ch+1}$ may be set to the value '1.' In this example, the other coefficients b may be set to the value '0.'

A ranked list of features may be created. The main effect corresponding to the target port and the main effects corresponding to the neighboring input ports may be placed at the top of the ranked list of features. For example $x_{ch-1}$, $x_{ch}$, and $x_{ch+1}$ may be placed in the ranked features list. Domain knowledge may be used to determine which main effects to place in the ranked list of features. Any feature or combination of features may be placed in the ranked list of features.

At step 715 a residual value of the linear model may be determined. The residual value may be calculated by subtracting values of the features in the ranked list of features from the measured gain of the target port. An example of a formula for determining the residual value is $y_{ch} - (b_{ch-1} x_{ch-1} + b_{ch} x_{ch} + b_{ch+1} x_{ch+1})$.

At step 720 a feature in the unranked list of features may be determined. The determined feature may comprise the feature most correlated with the residual value determined at step 715. At step 725 the feature determined at step 720 may be moved from the unranked list of features to the ranked list of features. The feature determined at step 720 may be added as the lowest ranked feature in the ranked list of features.

At step 730 a determination may be made as to whether all features have been ranked. If no features remain in the unranked feature list, the ranked list of features may be stored at 740. The ranked list of features may be stored in a database and/or transmitted.

If features remain in the unranked feature list at step 730, the next feature most correlated to the residual may be determined at step 720.

Figure 8:
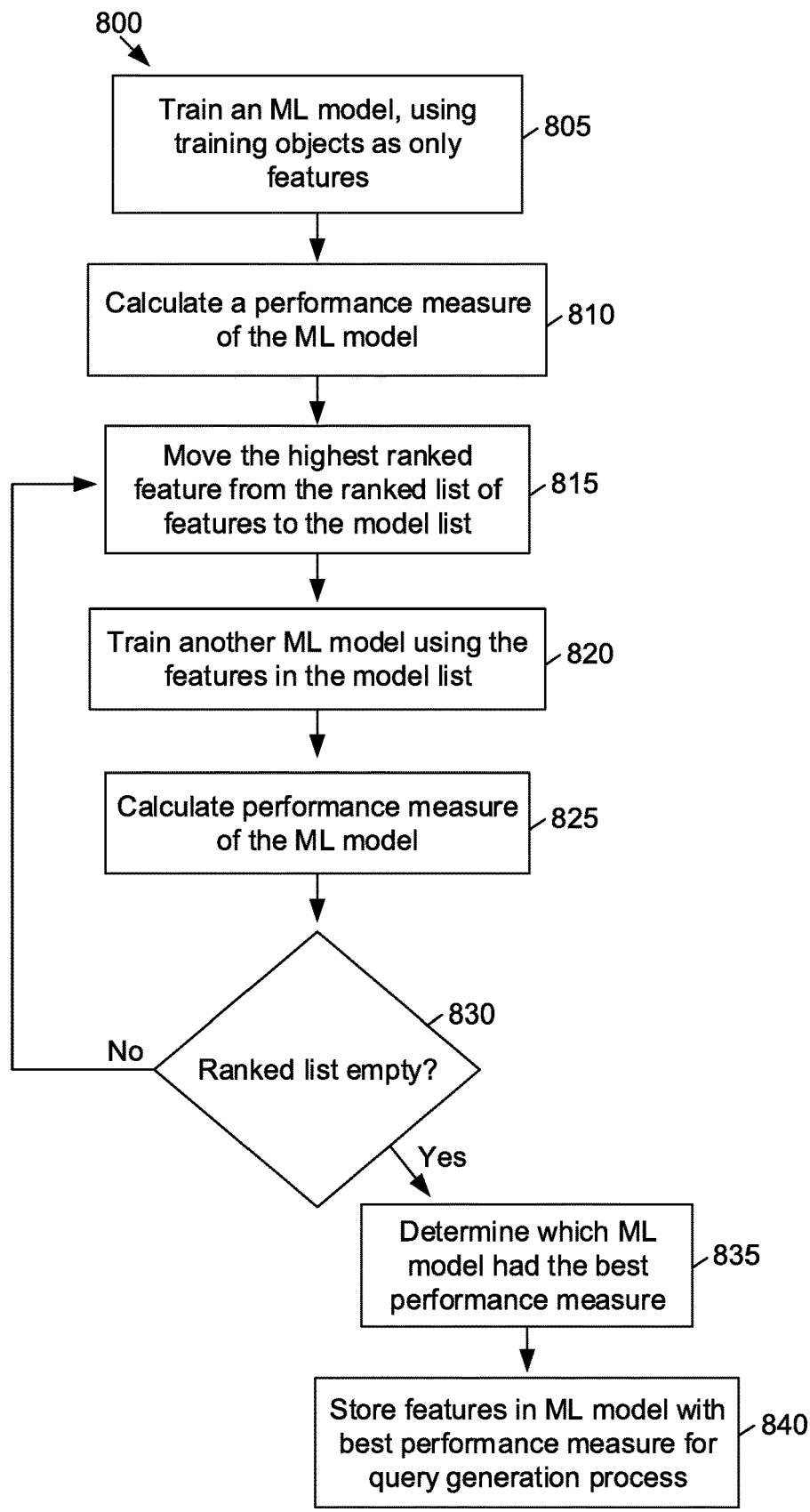
FIG. 8 is a flow diagram of a method for selecting a model according to one or more illustrative aspects of the disclosure.

FIG. 8 is a flow diagram of a method 800 for selecting a ML model generated according to one or more illustrative aspects of the disclosure. In one or more embodiments, the method 800 or one or more steps thereof may be performed by one or more computing devices or entities. For example, portions of the method 800 may be performed by components of the computing system 100. The method 800 or one or more steps thereof may be embodied in computer-executable instructions that are stored in a computer-readable medium, such as a non-transitory computer-readable medium. Some steps or portions of steps in the flow diagram may be omitted or changed in order.

At step 805, an ML model 420 may be generated using a set of labeled training objects 410. The ML model 420 may thereby generate an ML model 420. A model list may be generated, where the model list comprises one or more features, such as primary features and extra features.

At step 810, a performance measure of the ML model 420 may be calculated. The performance measure may be based on the ML model 420 and/or the set of training objects 410. For example a BIC algorithm may be used to determine the performance measure. In this example, the output of the BIC algorithm may comprise the performance measure. The performance measure may indicate how well the ML model 420 fits the training objects 410. The ML model 420 and/or the performance measure may be stored, such as in a database or a list.

At step 815, a feature from the ranked list of features may be added to the model list. The added feature may comprise the highest ranked feature in the ranked list of features. One or more highest-ranked features may be added to the model list. The first highest ranked feature in the feature list may be the feature corresponding to the target port. For example if the target port associated with channel 40 is selected, the model list may comprise $x_{40}$ at step 815. The feature corresponding to the target port may be removed from the ranked feature list and placed in the model list.

At step 820 the ML model 420 may be trained using the set of training objects 410. The training objects may be augmented to include features from the feature list. The ML model 420 trained at step 820 may be trained using these augmented training objects, and the model may thereby include the features from the features list. For example if the model list comprises the features $x_2$ and $x_7$, the ML model 420 may comprise the features $x_2$ and $x_7$.

At step 825 a performance measure corresponding to the ML model 420 generated at step 820 may be determined. The performance measure may be calculated in the same or a similar manner to the performance measure calculated at step 810. For example if a BIC algorithm is used at step 810, the BIC algorithm may be used at step 825. The ML model 420 and/or the performance measure may be stored, such as in a database or a list.

At step 830, the ranked list may be checked to determine whether the ranked list is empty. If the ranked list is not empty the method 800 may proceed to step 815, where the highest ranked feature from the ranked list may be moved to the model list. The training objects may be augmented to include the highest ranked feature. Then at step 820 an additional ML model 420 may be generated and trained using the augmented training objects.

If the ranked list is empty at step 830, the method 800 may proceed to step 835. At step 835 the performance measures calculated at steps 810 and 825 for each ML model 420 may be compared. The ML model 420 having the best performance measure may be determined. The ML model 420 having the best performance measure may be the ML model 420 that best fits, i.e. best predicts, the set of training objects 410.

At step 840 the features used for generating the ML model 420 with the best performance measure may be stored. The ML model 420 corresponding to the best performance measure may be stored. The features and/or the ML model 420 may be used to generate candidate training objects 430 and/or additional training objects 440. The ML model 420 may be used to predict the gain of the target port when given input values for the features used for generating the ML model 420.

Figure 9:
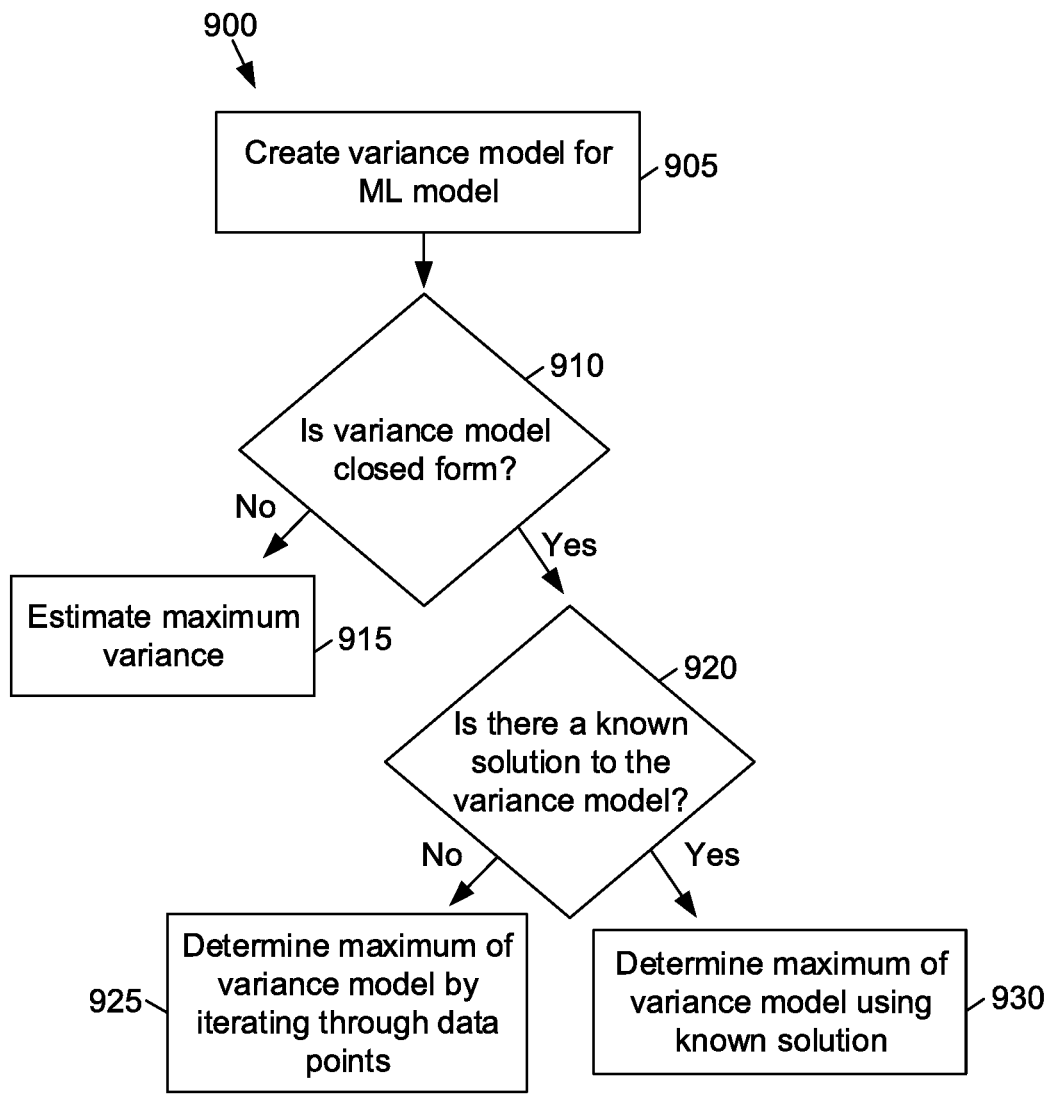
FIG. 9 is a flow diagram of a method for determining an additional training object based on variance according to one or more illustrative aspects of the disclosure.

FIG. 9 is a flow diagram of a method 900 for determining an additional labeled training object based on variance according to one or more illustrative aspects of the disclosure. In one or more embodiments, the method 900 or one or more steps thereof may be performed by one or more computing systems, such as the computing system 100. For example, portions of the method 900 may be performed by components of the computing system 100. The method 900 or one or more steps thereof may be embodied in computer-executable instructions that are stored in a computer-readable medium, such as a non-transitory computer-readable medium. Some steps or portions of steps in the flow diagram may be omitted or changed in order.

At step 905 a variance model for a generated ML model 420 may be generated. The variance model may be generated based on the type of the generated ML model 420 and/or a set of labeled training objects 410. The set of labeled training objects 410 may have been used to train a ML model that resulted in the generated ML model 420.

At step 910 the variance model may be examined to determine whether it is a closed form function. If the variance model is not in a closed form, the method 900 may continue at step 915.

At step 915 a maximum variance may be estimated. The variance may comprise a variance in predicted gain values of the generated ML model 420. A variance may be calculated, using the variance model, for one or more channel loadings (e.g., input combinations). A set of all possible input combinations for features in the variance model may be generated, and a variance may be calculated for each input combination in the set of all input combinations. The input combinations may be ranked based on the estimated variance of the predicted gain value corresponding to each input combination. One or more input combinations having the highest estimated variance may be stored. For example the fifty highest-ranked input combinations may be selected and/or stored.

If the variance model is determined to be in a closed form at step 910, the method 900 may continue at step 920. At step 920 the method 900 may determine whether there is a known solution to the variance model created at step 905. A known solution might provide one or more maximums of the variance model. In other words, the known solution might identify one or more channel loadings (e.g. input combinations) with the highest variance.

If there is a known solution, the one or more maximums of the variance model may be determined at step 930. Channel loadings (e.g. input combinations) corresponding to the one or more maximums may be stored. A number of channel loadings (e.g. input combinations) having a highest variance may be stored. For example, the fifty channel loadings (e.g. input combinations) having the highest variance may be determined and stored. Methods 1000 and 1100, described below and in FIGS. 10 and 11, may be used at step 930 to determine candidate training objects 430 corresponding to a highest variance.

If there is not a known solution to the variance model, a maximum variance may be determined at step 925 by iterating through a set of channel loadings (e.g. input combinations). The set of channel loadings (e.g. input combinations) may comprise all possible channel loadings (e.g. input combinations) for the features used in the variance model. For each channel loadings (e.g. input combination) in the set of channel loadings (e.g. input combinations), a variance may be calculated using the variance model. The channel loadings (e.g. input combinations) may be ranked based on the calculated variance, and one or more of the highest-ranked channel loadings (e.g. input combinations) may be selected and/or stored. Methods 1200 and 1300, described below and in FIGS. 12 and 13, may be used at step 925 to determine candidate training objects 430.

Figure 10:
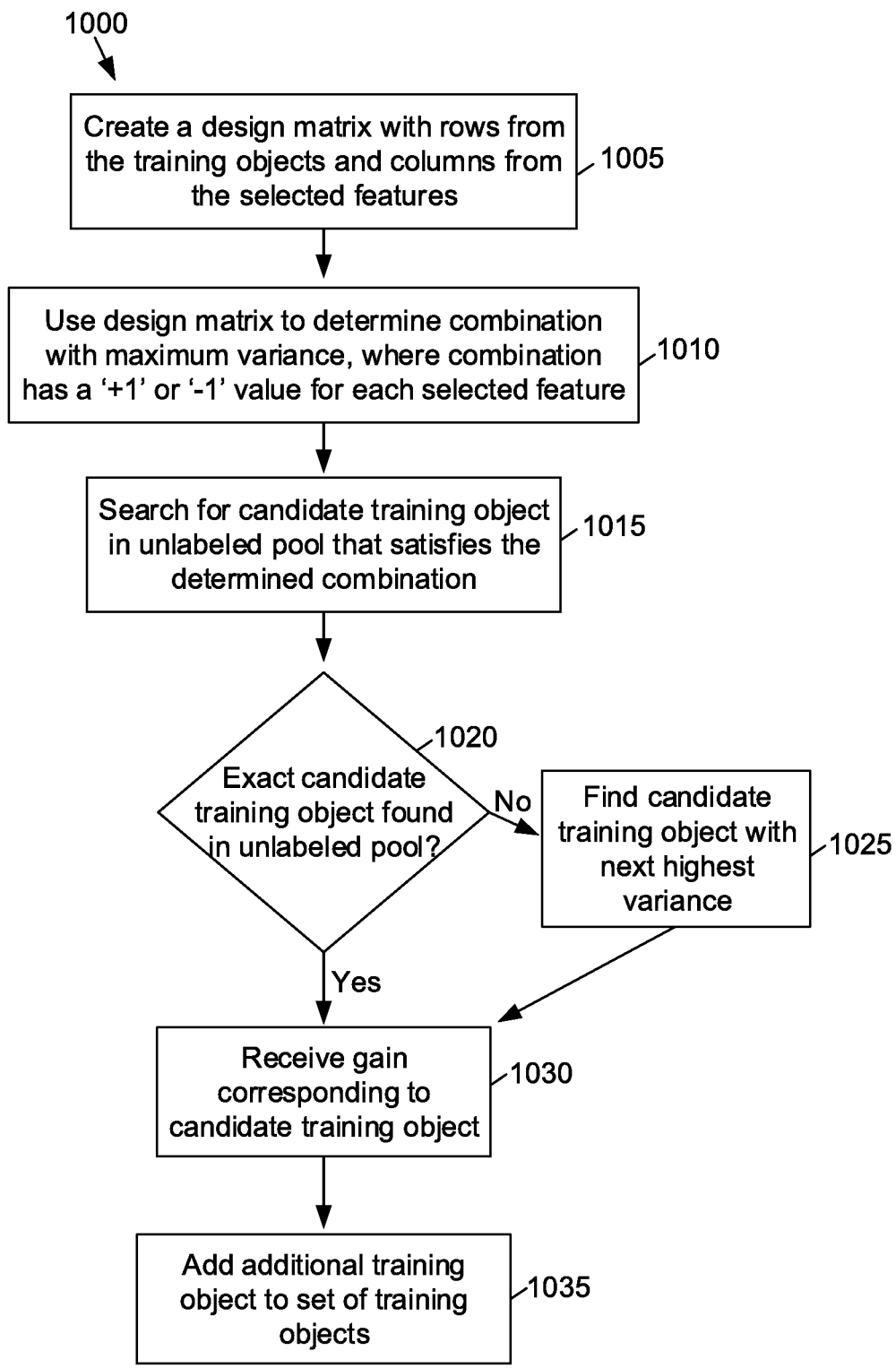
FIG. 10 is a flow diagram of a method for solving a variance model and selecting additional training objects from a pool according to one or more illustrative aspects of the disclosure.

FIG. 10 is a flow diagram of a method 1000 for solving a variance model and selecting additional training objects from a pool according to one or more illustrative aspects of the disclosure. In one or more embodiments, the method 1000 or one or more steps thereof may be performed by one or more computing devices or entities. For example, portions of the method 1000 may be performed by components of the computing system 100. The method 1000 or one or more steps thereof may be embodied in computer-executable instructions that are stored in a computer-readable medium, such as a non-transitory computer-readable medium. Some steps or portions of steps in the flow diagram may be omitted or changed in order.

The method 1000 may be used to determine additional training objects 440 based on a variance model. The method 1000 may be used when the variance model is a closed form variance model with a known solution.

At step 1005 a design matrix may be generated based on a set of labeled training objects 410. The design matrix may comprise all or a portion of the labeled training objects 410. The design matrix may comprise a portion of each of the labeled training objects 410. The columns of the design matrix may comprise one or more features, such as features that were used for generating the ML model 420. The rows of the design matrix may comprise the labeled training objects 410. Each row of the design matrix may comprise one training labeled object 410.

At step 1010 the design matrix may be used to determine a channel loading (e.g., an input combination) having a maximum variance. A variance model, such as a closed-form variance model with a known solution may be determined and/or generated. The variance model may be solved, using the design matrix, to determine one or more channel loadings (e.g, input combinations) having a highest variance. The channel loadings (e.g, input combinations) may comprise a '1' or '−1' value for each column of the design matrix, i.e. for each selected feature.

A maximum variance may be determined using sign ($e_{min}$), where $e_{min}$ is the eigenvector corresponding to the smallest eigenvalue of $X^T X$, and where X is the design matrix. The eigenvector $e_{min}$ may comprise the channel loading (e.g, input combination) having the maximum variance.

At step 1015 a pool of candidate training objects 430 may be searched for a training object that satisfies the channel loading (e.g., input combination) determined at step 1010. The pool of candidate training objects 430 may comprise a one or more training objects that have been labeled (e.g, include a measured gain value for the channel loading (e.g., input combination) of the candidate training object 430) but have not yet been used for further training the generated ML model 420. The channel loading (e.g., input combination) determined at step 1010 may comprise a subset of features of the candidate training objects 430. For example the candidate training objects 430 may comprise values for forty different features, whereas the channel loading (e.g., input combination) may comprise values for five of those features. At step 1015 the pool of candidate training objects 430 may be searched for candidate training objects 430 that match the subset of features in the determined channel loading (e.g., input combination). The value of the remaining features, not in the determined the channel loading (e.g., input combination), may be any combination of '−1' and '1.'

If an exact candidate training object 430 matching the channel loading (e.g., input combination) is not found at step 1020, a candidate training object 430 in the pool of candidate training objects 430 with the next highest variance may be determined at step 1025. A channel loading (e.g., input combination) having the next highest variance may be determined, and the unlabeled pool of candidate training objects 430 may be searched for a matching candidate training object 430. If that search is unsuccessful, an input combination having the third-highest variance may be determined, and this process may repeat until a candidate training object 430 is found.

After finding a candidate training object 430, either at step 1020 or step 1025, the gain corresponding to the candidate training object 430 may be received. The gain corresponding to the channel loading (e.g., the input combination) of the candidate training object 430 may be requested. For example, a database, which stores the gain values for channel loadings (e.g., input combinations), may be queried for the gain corresponding to the channel loading (e.g., the input combination) of the candidate training object 430. The gain may be a measured gain, such as a measured gain of output ports of the amplifier device 210 given the channel loadings (e.g., input combinations) of the candidate training object 430. The candidate training object 430 may be transmitted to a user or a device configured to measure the gain of a target port (e.g, channel). The operator or the device may then measure the gain of the target output port (e.g., channel), given the channel loading (e.g., input combination) of the candidate training object 430.

At step 1035 an additional training object 440 corresponding to the candidate training object 430 may be an additional labeled training object which is added to the set of labeled training objects 410 to produce an updated set of labeled training objects 410. The candidate training object 430 may be removed from the pool of candidate training objects 430 and added to the set of labeled training objects 410. The additional training object 440 may comprise the channel loading (e.g., input combination) of the candidate training object 430 and the measured gain of the target output port (e.g., channel). The additional labeled training object, in addition to the other labeled training objects in the set of labeled training objects 410, may be used to further train the ML model 420 for the target output port (e.g., target channel).

Figure 11:
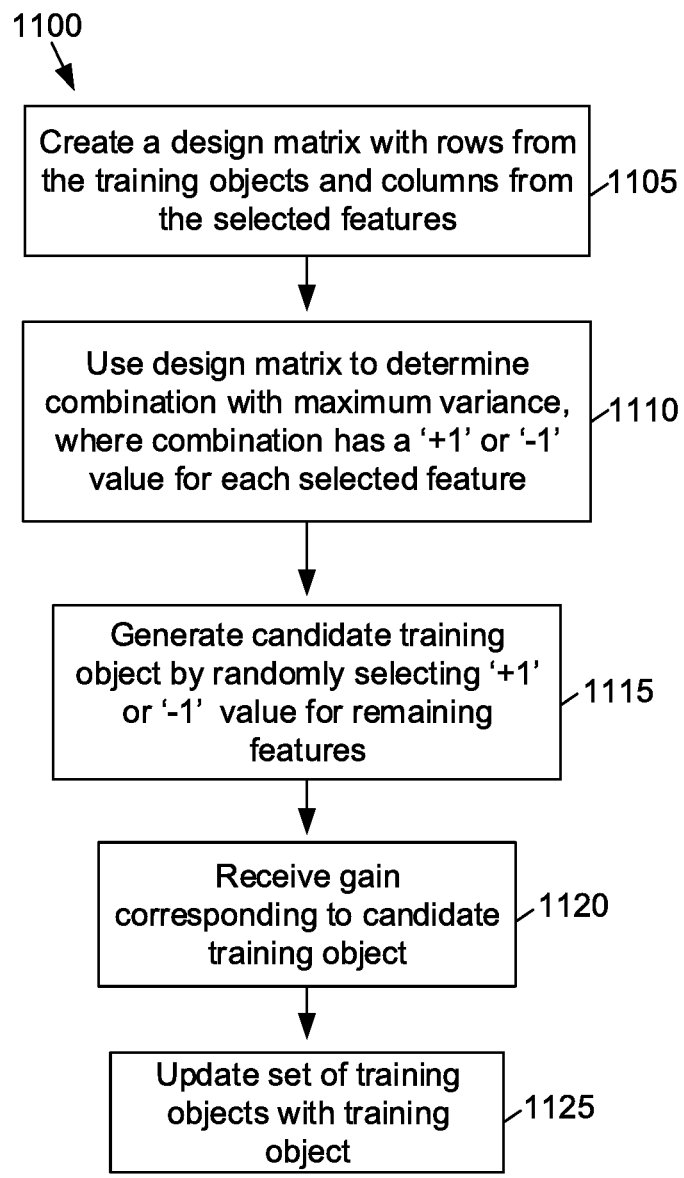
FIG. 11 is a flow diagram of a method for solving a variance model and generating an additional training object according to one or more illustrative aspects of the disclosure.

FIG. 11 is a flow diagram of a method 1100 for solving a variance model and generating an additional training object according to one or more illustrative aspects of the disclosure. In one or more embodiments, the method 1100 or one or more steps thereof may be performed by one or more computing devices or entities. For example, portions of the method 1100 may be performed by components of the computing device 100. The method 1100 or one or more steps thereof may be embodied in computer-executable instructions that are stored in a computer-readable medium, such as a non-transitory computer-readable medium. Some steps or portions of steps in the flow diagram may be omitted or changed in order.

The method 1100 may be used to determine additional training objects 440 based on a variance model. The method 1100 may be used when the variance model is a closed form variance model with a known solution.

At step 1105 a design matrix may be generated based on a set of labeled training objects 410. At step 1110 the design matrix may be used to determine one or more channel loadings (or input combinations) having a maximum variance. Actions performed at steps 1105 and 1110 may be similar to those described above in regard to steps 1005 and 1010, respectively.

At step 1115, an unlabeled candidate training object 430 may be generated. In contrast to FIG. 10, where the unlabeled candidate training object was selected from an unlabeled pool of unlabeled candidate training objects 430, any possible channel loading (e.g., input combination) may be available for the unlabeled candidate training object 430 generated at step 1115. The unlabeled candidate training object 430 may be generated by randomly selecting values for the remaining features that are not included in the channel loading (e.g., input combination). For example if the channel loading (e.g., input combination) determined at step 1110 has values for seven features, but the generated ML model 420 corresponds to a channel of a forty-channel amplifier 210, values for the remaining thirty three channels may be randomly selected and used in the unlabeled candidate training object 430. The values for the remaining features may be all set to '−1,' may all be set to '1,' may be randomly selected, or may be otherwise determined. The values for the remaining features may be determined by combining unlabeled candidate training objects generated for other target ports (e.g., target channels).

At step 1120 the gain corresponding to the unlabeled candidate training object 430 may be received. Actions performed at step 1120 may be similar to those described above in regard to step 1030. For example, the unlabeled candidate training object 430 may be displayed to a user, and the user may configure the amplifier device 210 based on the unlabeled candidate training object 430, and measure the gain of one or more output ports.

At step 1125 an additional training object 440 corresponding to the unlabeled candidate training object 430 may be labeled and added to the set of labeled training objects 410. The additional training object 440 may comprise the channel loading (e.g., input combination) of the unlabeled candidate training object 430 and may be labeled with the measured gain of the target port (e.g., target channel) to generate a labeled additional training object. The additional labeled training object, in addition to the other labeled training objects in the set of labeled training objects 410, may be used to further train the generated ML model 420 for the target port (e.g., target channel).

Figure 12:
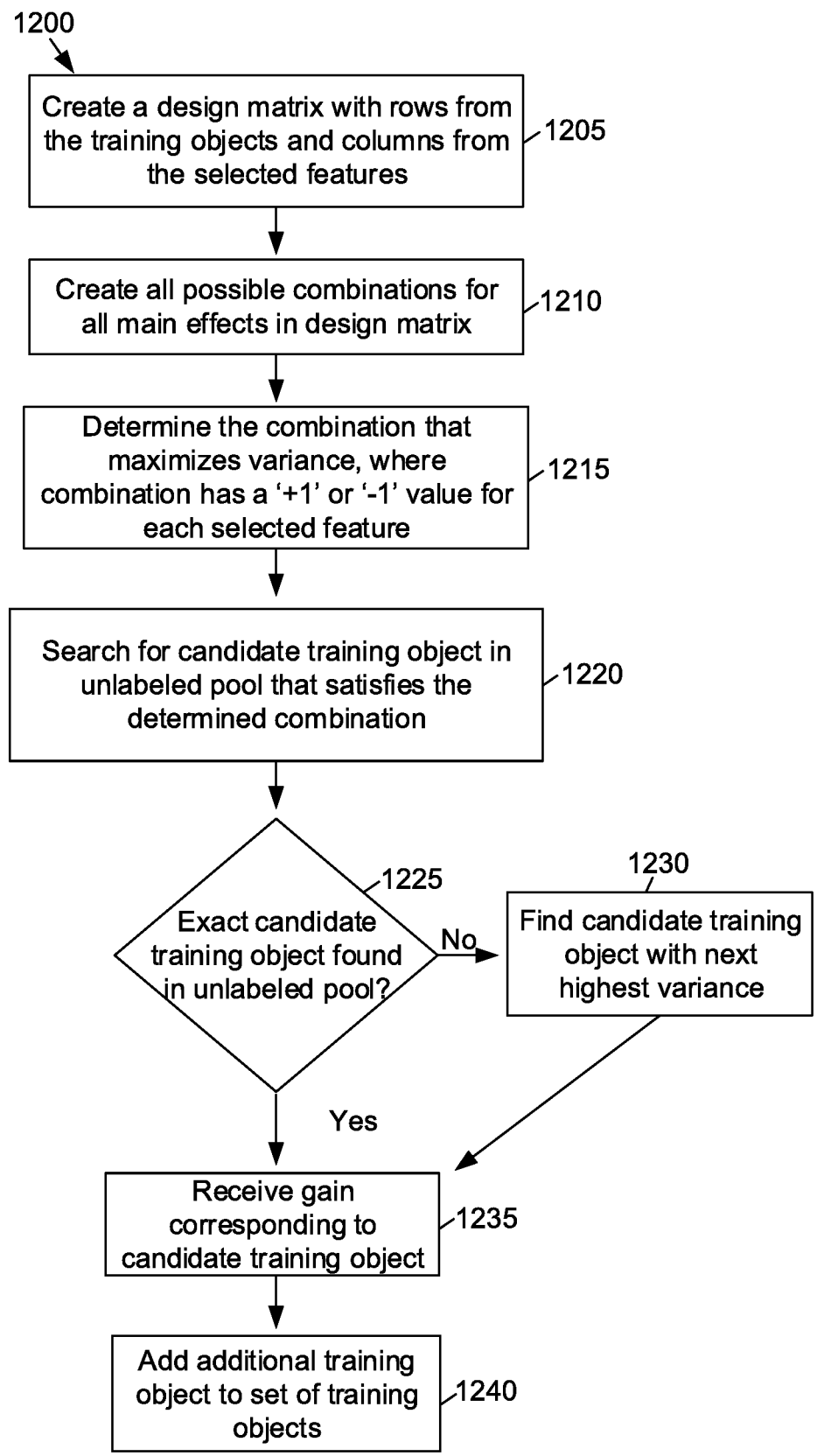
FIG. 12 is a flow diagram of a method for iteratively determining a maximum variance and selecting additional training objects from a pool according to one or more illustrative aspects of the disclosure.

FIG. 12 is a flow diagram of a method 1200 for iteratively determining a maximum variance and selecting additional training objects from a pool according to one or more illustrative aspects of the disclosure. In one or more embodiments, the method 1200 or one or more steps thereof may be performed by one or more computing devices or entities. For example, portions of the method 1200 may be performed by components of the computing device 100. The method 1200 or one or more steps thereof may be embodied in computer-executable instructions that are stored in a computer-readable medium, such as a non-transitory computer-readable medium. Some steps or portions of steps in the flow diagram may be omitted or changed in order.

The method 1200 may be used to determine additional training objects 440 based on a variance model. The method 1200 may be used when the variance model is a closed form variance model without a known solution.

At step 1205 a design matrix may be created based on the set of labeled training objects 410. Actions performed at step 1205 may be similar to those described above in regard to steps 1005.

At step 1210 all possible channel loadings (e.g., input combinations) of the main effects in the design matrix may be determined. A set of all possible channel loadings (e.g., input combinations) for main effects in the variance model may be generated. Each channel loading (e.g., input combination) may comprise a '1' or '−1' value for each of the main effects in the design matrix.

At step 1215 one or more channel loadings (e.g., input combinations) that maximize variance may be determined.

A variance model corresponding to the design matrix may be determined and/or received. Each channel loading (or input combination) may be applied to the variance model, and a variance corresponding to each channel loading (e.g., input combination) may be output. The variance of each channel loading (e.g., input combination) may be stored. Each channel loading (e.g., input combination) may then be ranked based on variance, to determine the channel loading (e.g., input combination) or channel loadings (or input combinations) having the highest variance. The variance may be calculated as $\underline{x}^T(X^TX)^{-1}\underline{x}$, where X is the design matrix, and each channel loading (e.g., input combination) is $\underline{x}$.

At step 1220 an unlabeled pool of unlabeled candidate training objects 430 may be searched for an unlabeled candidate training object that matches the channel loading (e.g., input combination) determined at step 1215. At step 1225 the method 1200 may determine whether an exact unlabeled candidate training object 430 was found in the unlabeled pool. If a matching unlabeled candidate training object 430 was not found, the unlabeled candidate training object 430 in the unlabeled pool with the highest variance may be determined at step 1230.

After the unlabeled candidate training object 430 has been determined, at step 1225 or step 1230, the gain corresponding to the channel loading (e.g., input combination) of the unlabeled candidate training object 430 may be predicted using the generated ML model 420 at step 1235. At step 1240 an additional training object 440 comprising the channel loading (e.g., input combination) of the candidate training object 430 may be labeled with the measured gain of the target port and the labeled additional training object may be added to the set of labeled training objects 410. Actions performed at steps 1220-40 may be similar to actions described above in regard to steps 1015-35.

Figure 13:
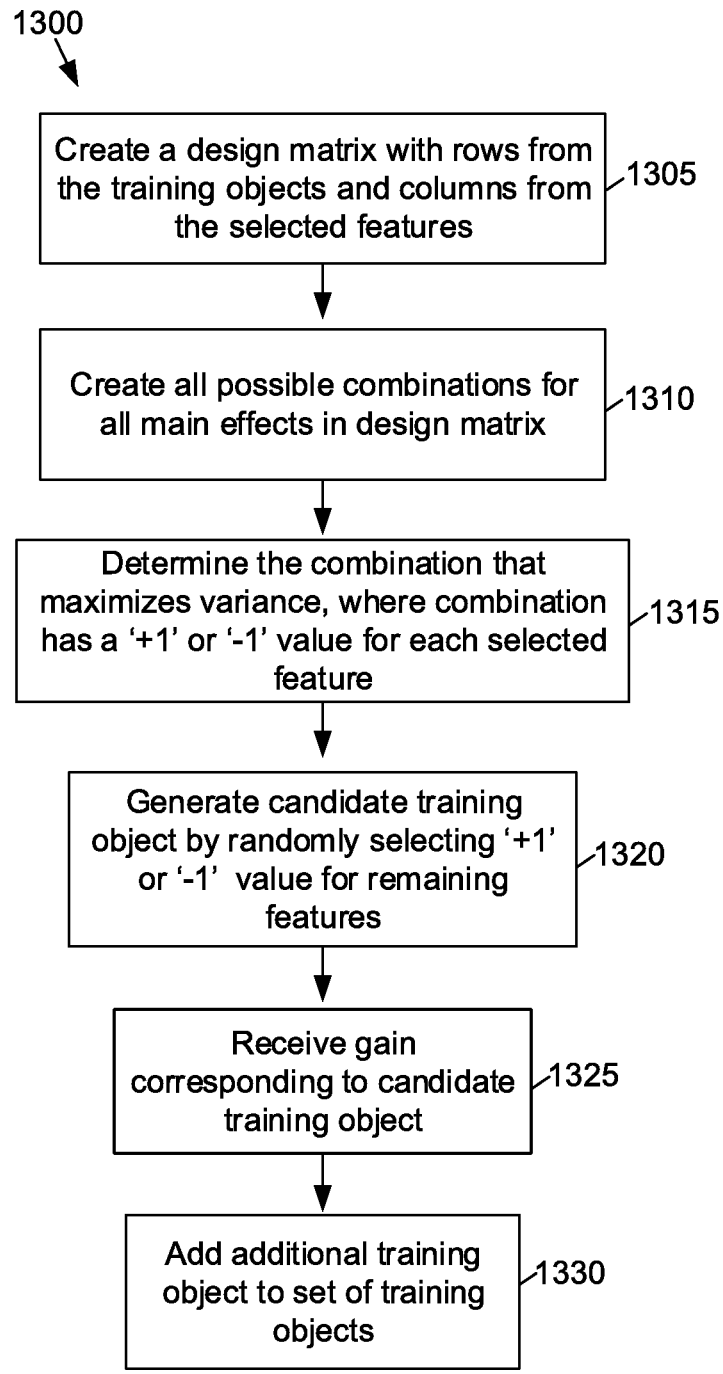
FIG. 13 is a flow diagram of a method for iteratively determining a maximum variance and generating an additional training object according to one or more illustrative aspects of the disclosure.

FIG. 13 is a flow diagram of a method 1300 for iteratively determining a maximum variance and generating an additional training object according to one or more illustrative aspects of the disclosure. In one or more embodiments, the method 1300 or one or more steps thereof may be performed by one or more computing devices or entities. For example, the method 1300 may be performed by routines or subroutines of software executed by the processor computing device 100. The method 1300 or one or more steps thereof may be embodied in computer-executable instructions that are stored in a computer-readable medium, such as a non-transitory computer-readable medium. Some steps or portions of steps in the flow diagram may be omitted or changed in order.

The method 1300 may be used to determine additional training objects 440 based on a variance model. The method 1300 may be used when the variance model is a closed form variance model without a known solution.

At step 1305 a design matrix may be created based on the set of labeled training objects 410. Actions performed at step 1305 may be similar to those described above in regard to step 1005. At step 1310 all possible channel loadings (e.g., input combinations) of the main effects in the design matrix may be determined. At step 1215 the channel loading (e.g., input combination) that maximizes variance may be determined. Actions performed at steps 1310 and 1315 may be similar to those described above in regard to steps 1210 and 1215, respectively.

At step 1320, a candidate training object 430 may be generated by randomly selecting values for the remaining features that are not included in the channel loading (e.g., input combination). In contrast to FIG. 12, where the unlabeled candidate training object was selected from an unlabeled pool of candidate training objects 430, any possible channel loading (e.g., input combination) may be available for the candidate training object 430 generated at step 1320. Actions performed at step 1320 may be similar to those described above in regard to step 1115. At step 1325 the gain corresponding to the channel loading (e.g., input combination) for the unlabeled candidate training object 430 may be received. Actions performed at step 1325 may be similar to those described above in regard to step 1030. At step 1330 an additional training object 440 corresponding to the unlabeled candidate training object 430 may be labeled and added to the set of labeled training objects 410 to produce an updated set of labeled training objects 410. Actions performed at step 1330 may be similar to those described above in regard to step 1125.

Figure 14:
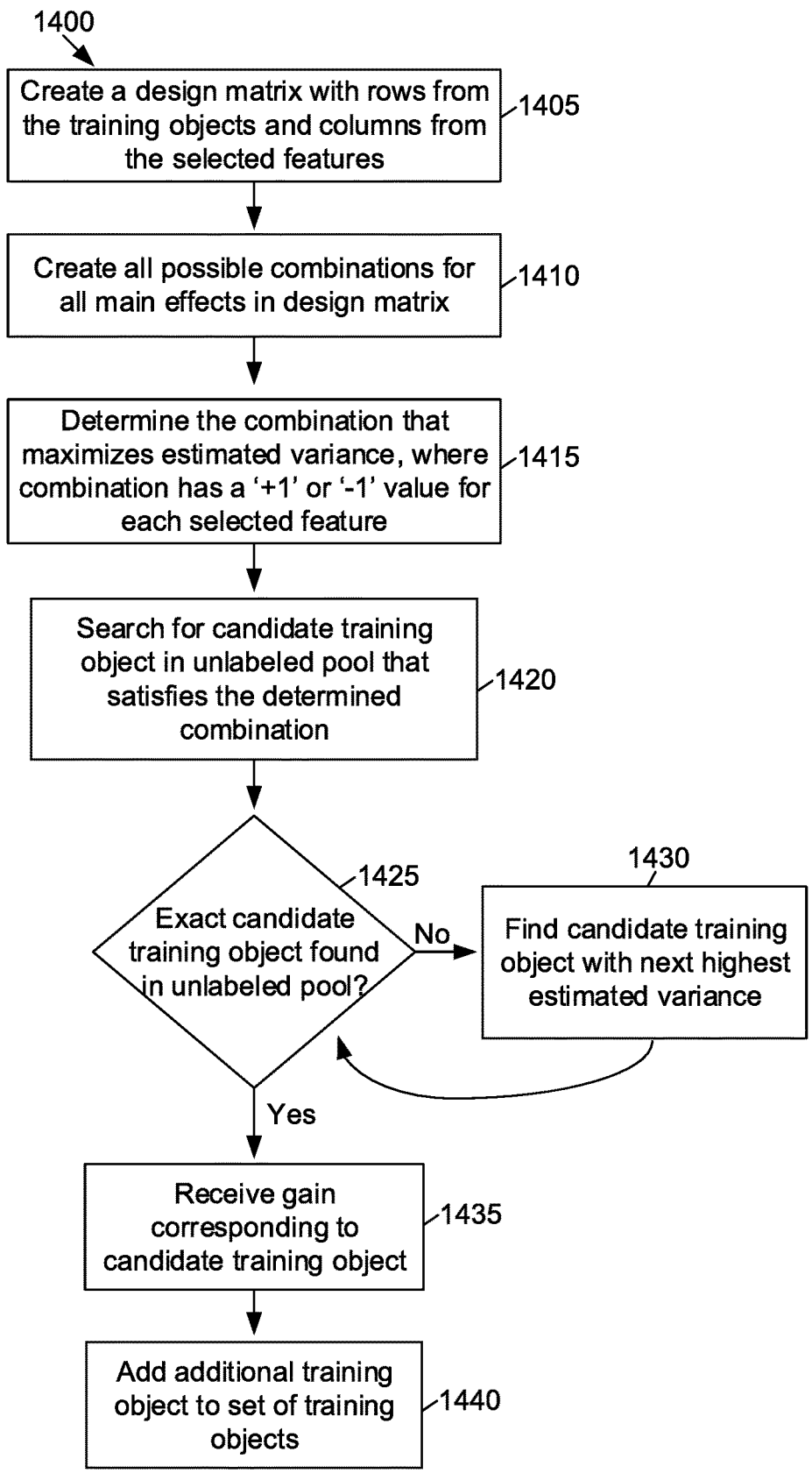
FIG. 14 is a flow diagram of a method for iteratively determining a maximum empirical variance and selecting additional training objects from a pool according to one or more illustrative aspects of the disclosure.

FIG. 14 is a flow diagram of a method 1400 for iteratively determining a maximum empirical variance and selecting additional training objects 440 from a pool of unlabeled candidate training objects according to one or more illustrative aspects of the disclosure. In one or more embodiments, the method 1400 or one or more steps thereof may be performed by one or more computing devices or entities. For example, portions of the method 1400 may be performed by components of the computing system 100. The method 1400 or one or more steps thereof may be embodied in computer-executable instructions that are stored in a computer-readable medium, such as a non-transitory computer-readable medium. Some steps or portions of steps in the flow diagram may be omitted or changed in order.

The method 1400 may be used to determine additional training objects 440 based on an estimated variance. The method 1400 may be used when a variance is estimated.

At step 1405 a design matrix may be created based on the set of labeled training objects 410. Actions performed at step 1405 may be similar to those described above in regard to step 1005. At step 1410 all possible channel loading (e.g., input combinations) of the main effects in the design matrix may be determined. Actions performed at step 1410 may be similar to those described above in regard to step 1210.

At step 1415 a channel loading (e.g., an input combination) with a highest estimated variance may be determined. Each of the possible channel loadings (e.g., input combinations) determined at step 1410 may be input to the variance model, and an estimated variance may be determined for each of the possible channel loadings (e.g., input combinations). The channel loadings (e.g., input combinations) may be ranked based on their estimated variance, and one or more of the highest-ranked channel loadings (e.g., input combinations) may be selected.

The variance model may comprise one or more generated ML models 420 for a target port (e.g, target channel), such as one or more trees. To calculate the estimated variance of a channel loading (or an input combination), the channel loading (e.g., input combination) may be input to each of the generated ML models 420. The generated ML models 420 may each output an estimated or predicted gain of a target port (e.g. target channel) the input combination. The variance may be estimated based on these calculated gain values. An channel loading (e.g., input combination) having a relatively wide range of gain values may have a higher estimated variance than channel loading (or an input combination) for which all of the calculated gain values are very similar.

The empirical variance $\hat{\mathbb{V}}(x)$ may be determined using the formula $$\hat{\mathbb{V}}(x) = \frac{1}{B-1}\sum_{b=1}^{B}(\hat{y}_b - \bar{\hat{y}})^2$$

$$\text{where } \bar{\hat{y}} = \frac{1}{B}\sum_{b=1}^{B}\hat{y}_b.$$

In this formula B is the amount of trees, and $\hat{y}_b$ is the prediction of tree b for a given channel loading (e.g., input combination).

At step 1420 an unlabeled pool of candidate training objects 430 may be searched for an unlabeled candidate training object that matches the channel loading (e.g., input combination) determined at step 1415. At step 1425 the method 1400 may determine whether an exact unlabeled candidate training object 430 was found in the unlabeled pool. If a matching unlabeled candidate training object 430 was not found, the unlabeled candidate training object 430 in the unlabeled pool with the highest variance may be determined at step 1430.

After the unlabeled candidate training object 430 has been determined, at step 1425 or step 1430, the gain corresponding to the unlabeled candidate training object 430 may be received at step 1435. At step 1440 an additional training object 440 comprising the channel loading (e.g., input combination) of the unlabeled candidate training object 430 may be label with the measured gain of the target port to generate an additional labeled training objection, and the additional labeled training object may be added to the set of labeled training objects 410 to produce an updated set of labeled training objects 410. Actions performed at steps 1420-40 may be similar to actions described above in regard to steps 1015-35.

Figure 15:
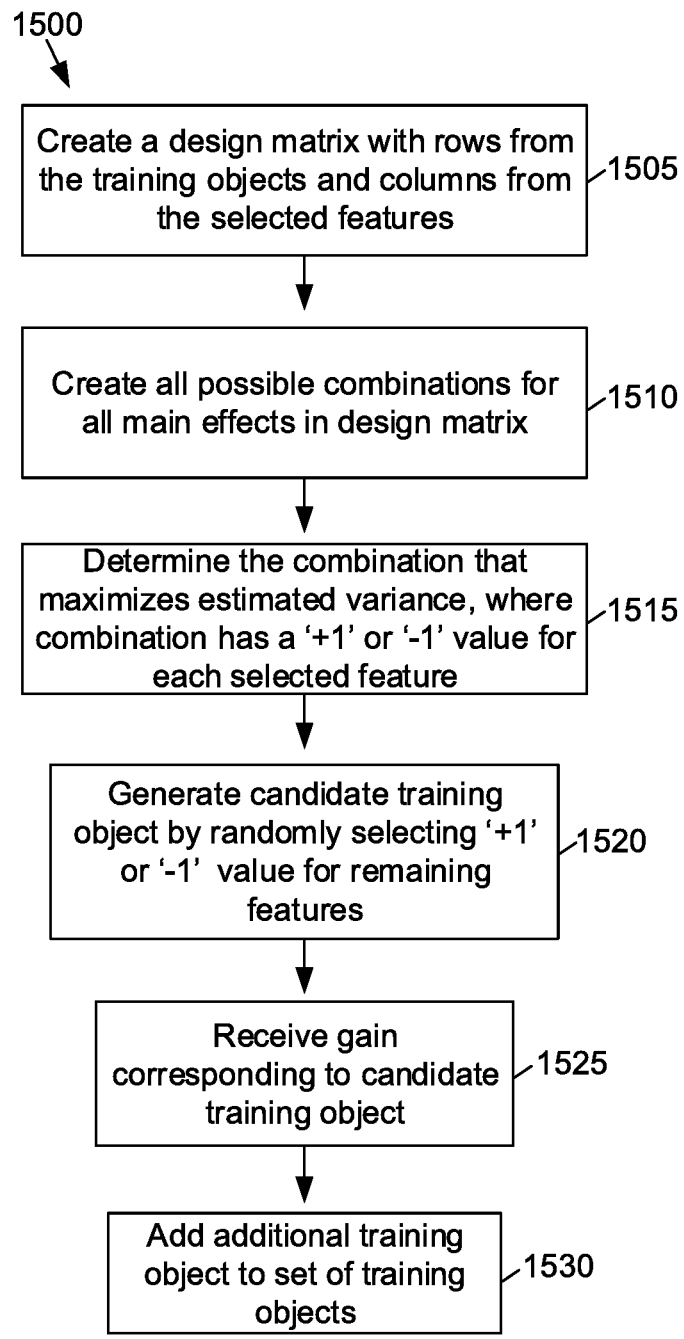
FIG. 15 is a flow diagram of a method for iteratively determining a maximum empirical variance and generating additional training objects according to one or more illustrative aspects of the disclosure.

FIG. 15 is a flow diagram of a method 1500 for iteratively determining a maximum empirical variance and generating additional training objects according to one or more illustrative aspects of the disclosure. In one or more embodiments, the method 1500 or one or more steps thereof may be performed by one or more computing systems. For example, portions of the method 1500 may be performed by the computing system 100. The method 1500 or one or more steps thereof may be embodied in computer-executable instructions that are stored in a computer-readable medium, such as a non-transitory computer-readable medium. Some steps or portions of steps in the flow diagram may be omitted or changed in order.

The method 1500 may be used to determine additional training objects 440 based on an estimated variance of the prediction of the generated ML model.

At step 1505 a design matrix may be created based on the set of labeled training objects 410. Actions performed at step 1505 may be similar to those described above in regard to step 1005. At step 1510 all possible input combinations of the main effects in the design matrix may be determined. Actions performed at step 1510 may be similar to those described above in regard to step 1210. At step 1515 the channel loading (e.g., input combination) that maximizes estimated variance may be determined. Actions performed at step 1515 may be similar to those described above in regard to step 1415.

At step 1520, an unlabeled candidate training object 430 may be generated by randomly selecting values for the remaining features that are not included in the channel loading (e.g., input combination). In contrast to FIG. 14, where the candidate training object was selected from an unlabeled pool of candidate training objects 430, any possible channel loading (e.g., input combination) may be available for the unlabeled candidate training object 430 generated at step 1520. Actions performed at step 1520 may be similar to those described above in regard to step 1115. At step 1525 the gain of a target channel may be received, where the gain for the target channel is determined by measuring the input signal strength and output signal strength of the target channel. Actions performed at step 1525 may be similar to those described above in regard to step 1030. At step 1530 an additional training object 440 comprising the channel loading (e.g., input combination) of the unlabeled candidate training object 430 may be labeled with the gain value of the target channel to generate an additional labeled training object, and the additional labeled training object may be added to the set of labeled training objects 410. Actions performed at step 1530 may be similar to those described above in regard to step 1125.

Figure 16:
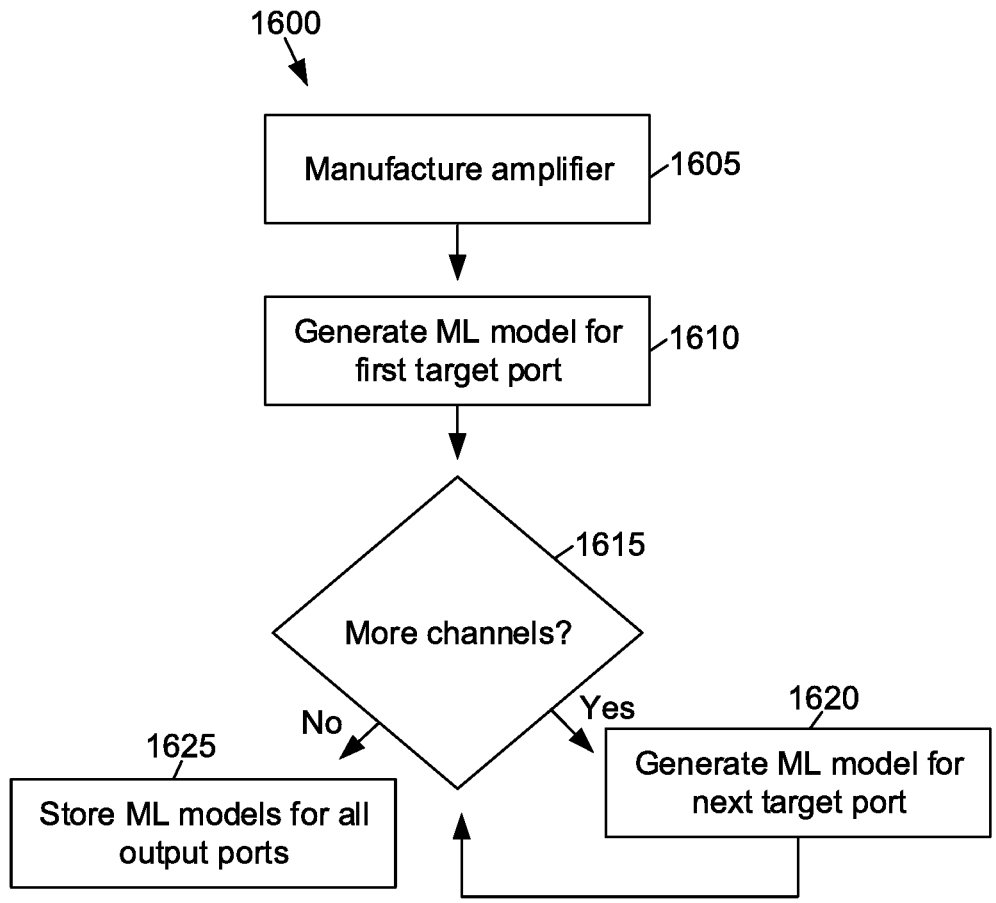
FIG. 16 is a flow diagram of a method for generating a model of a multi-channel amplifier according to one or more illustrative aspects of the disclosure.

FIG. 16 is a flow diagram of a method 1600 for generating a model of each channel of a multi-channel amplifier according to one or more illustrative aspects of the disclosure. In one or more embodiments, the method 1600 or one or more steps thereof may be performed by one or more computing systems. For example, portions of the method 1600 may be performed by of the processing unit of the computing system 100. The method 1600 or one or more steps thereof may be embodied in computer-executable instructions that are stored in a computer-readable medium, such as a non-transitory computer-readable medium. Some steps or portions of steps in the flow diagram may be omitted or changed in order.

At step 1605 an amplifier 210 may be manufactured. The amplifier 210 may be manufactured in a manufacturing facility, such as on a production line. An initial set of labeled training objects 410 may be collected for the amplifier 210. The set of labeled training objects 410 may be collected by inputting various signals to the input ports of the amplifier 210 and measuring the resulting gain on one or more output ports of the amplifier 210. When collecting the labeled training objects 410, the resulting gain may be measured for all output ports of the amplifier 210.

At step 1610 an ML model 420 for a first target channel of the amplifier 210 may be generated. The generated ML model 420 may model the gain of a single channel of the amplifier 210. The generated ML model 420 may comprise a linear model, quadratic model, a tree-based ensemble model, and any other type of ML model 420 such as neural networks, trees, etc. The ML model 420 may be generated while the amplifier 210 is at the manufacturing facility, such as while the amplifier 210 is on the production line. The ML model 420 may be generated at a testing facility, which may be at a same or different location as the manufacturing facility. The ML model 420 may be generated using steps of 505-536 of the method 500, described above.

At step 1615, a determination may be made of whether a ML model 420 have been generated for each output port (e.g., channel) of the amplifier device 210. In some instances, a list of desired channels may be used, and the determination may be whether an ML model 420 has been generated for each of the output ports corresponding to the desired channels. If there are more outputs ports (e.g., channels) to generate ML model 420 for, an ML model 420 may be generated for a next output port (e.g., channel) at step 1620. This process may repeat until a ML model 420 have been generated for each output port (e.g., channel) of the amplifier device 210, or each of the desired channels of the amplifier device 210.

Each time a ML model 420 is generated for an output port (e.g., channel) of the same amplifier device 210, the set of labeled training objects 410 may increase in size, as additional training objects 440 are labeled and added to the set of labeled training objects 410, thereby updating the set of labeled training objects 410. The increase in size of the set of labeled training objects 410 may increase the accuracy and/or efficiency of the ML model for each successive output port (e.g., channel). In other words, as more ML models 420 are generated, the amount of time used for generating each ML model 420 may decrease from the amount of time used for generating the prior generated ML model 420.

At step 1625 each of the generated ML model 420 may be stored, such as in a database. The generated ML model 420 may be associated with the amplifier device 210. The generated ML model 420 may be stored with a serial number of the amplifier device 210. The ML model 420 may be loaded to a storage unit of the amplifier device 210. The generated ML model may be stored on a storage device that is associated with the amplifier device 210.

Figure 17:
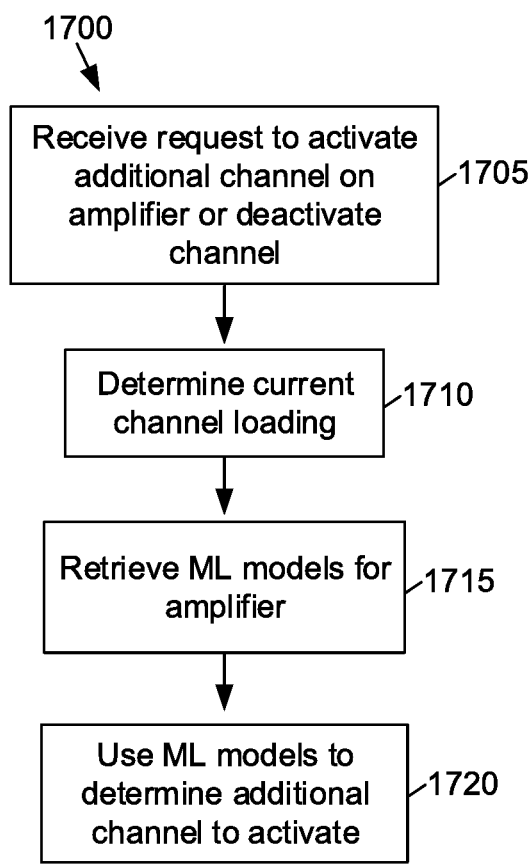
FIG. 17 is a flow diagram of a method for determining an additional channel to activate according to one or more illustrative aspects of the disclosure.

FIG. 17 is a flow diagram of a method 1700 for determining an additional channel to activate according to one or more illustrative aspects of the disclosure. In one or more embodiments, the method 1700 or one or more steps thereof may be performed by one or more computing systems. For example, portions of the method 1700 may be performed by of a processing unit of the computing system 100. The software includes n computer-executable instructions that are stored in a computer-readable medium, such as a non-transitory computer-readable medium. Some steps or portions of steps in the flow diagram may be omitted or changed in order.

At step 1705 a request may be received to activate one or more additional channels and/or deactivate one or more channels of an amplifier device 210. For example a technician may be installing equipment at a location, and may request to connect the newly installed equipment to an output port 225-1-225-40 of the amplifier device 210. In another example, a service may no longer be used, and the input and/or output ports corresponding to that channel may be deactivated.

At step 1710 the current channel loading of the amplifier device 210 may be determined. The current channel loading may indicate which channels and/or ports are active and which channels and/or ports are inactive. For example, the channel loading may indicate which of the output ports 225-1-225-40 are connected to cables, and/or which of the input ports 220-1-220-40 are active. The channel loading may be determined by querying a database, where the database may comprise network configuration information. The channel loading may be determined by a user, such as the technician. The channel loading may be determined by querying the amplifier device 210. The channel loading may be determined by monitoring network activity.

At step 1715 the generated ML model 420 of the gain for each channel of the amplifier device 210 may be retrieved. The generated ML models 420 may be retrieved from a database. A user, such as the technician, may enter a serial number and/or other identifying information of the amplifier device 210 to retrieve the generated ML model 420.

At step 1720 the generated ML models 420 may be used to determine one or more additional channel to activate or deactivate. The current channel loading determined at step 1710 may be used with one or more of the generated ML models 420 to determine the additional channel to activate. The additional channel may be selected to minimize any changes in gain of the currently active channels in the channel loading. The channel may be selected based on minimizing divergence in signal power on the channels with existing active signals.

Figure 18:
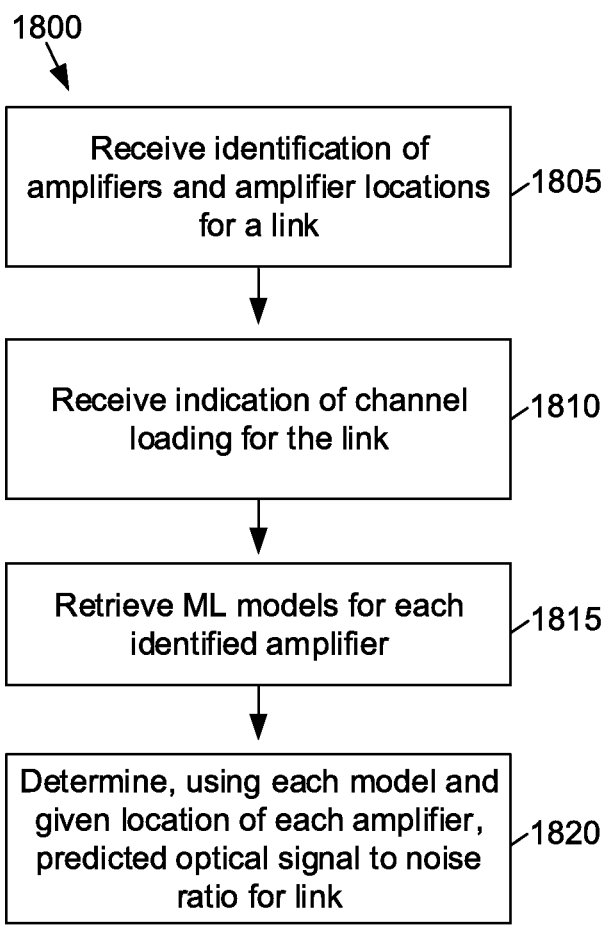
FIG. 18 is a flow diagram of a method for determining an optical signal-to-noise ratio according to one or more illustrative aspects of the disclosure.

FIG. 18 is a flow diagram of a method 1800 for determining an optical signal-to-noise ratio according to one or more illustrative aspects of the disclosure. In one or more embodiments, the method 1800 or one or more steps thereof may be performed by one or more computing systems. For example, the method 1800 may be performed by a processing unit of the computing system 100. The method 1800 or one or more steps thereof may be embodied in computer-executable instructions that are stored in a computer-readable medium, such as a non-transitory computer-readable medium. Some steps or portions of steps in the flow diagram may be omitted or changed in order.

At step 1805 one or more identifiers of amplifiers 210 and/or amplifier locations may be received. The amplifiers 210 and amplifier locations may correspond to a link, such as a link for data transmission. The link may comprise a fiber optic connection. For each amplifier 210, an identifier of the amplifier 210 may be received and/or a location of the amplifier 210. The identifier of the amplifier 210 may comprise a serial number and/or any other identifying information. The location of the amplifier 210 may comprise one or more distances from other objects on the link, such as distances from other amplifiers 210. The location of the amplifier 210 may be measured, such as by transmitting data on the link.

At step 1810 an indication of the channel loading for the link may be received. The channel loading may indicate one or more active channels on the link. At step 1815 a generated ML model for each channel of each of the amplifiers 210 on the link may be retrieved. Actions performed at steps 1810 and 1815 may be similar to those described above in regard to steps 1710 and 1715.

At step 1820, a predicted signal-to-noise ratio (SNR), such as an optical signal-to-noise ratio (OSNR), may be predicted for the link. The OSNR may be predicted using the channel loading and the generated ML model for each channel of each amplifier 210 on the link. The OSNR may be determined for one or more channels of the link. The OSNR may be calculated separately for each channel of the link.

Although example embodiments are described above, the various features and steps may be combined, divided, omitted, rearranged, revised or augmented in any desired manner, depending on the specific outcome or application. Various elements herein have been described as "A and/or B," which is intended to mean any of the following "A or B," "A and B," "one or more of A and one or more of B." Various alterations, modifications, and improvements will readily occur to those skilled in the art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   training a machine learning (ML) model using a set of labeled training objects and a ML algorithm to generate the ML model for predicting a gain associated with a target channel of a plurality of channels of an amplifier device, each labeled training object in the set of labeled training objects comprising an indication of a channel loading for the amplifier device, and an indication of a gain for the target channel;
receiving a plurality of unlabeled training objects, each unlabeled training object comprising an indication of a channel loading for the amplifier device;
determining an additional labeled training object from the unlabeled training objects for further training the generated ML model, the determining comprising:
determining, based on a type of the generated ML model and the plurality of unlabeled training objects, a variance model comprising a closed form function;
determining a solution to the variance model;
determining, based on the solution to the variance model, a maximum of the variance model;
selecting, based on the maximum of the variance model, a candidate training object from the plurality of unlabeled training objects;
receiving a measured gain value for the target channel based on the channel loading indicated by the candidate training object; and
generating, based on the candidate training object and the measured gain value, the additional labeled training object;
adding the additional labeled training object to the set of labeled training objects; and
further training the generated ML model using the set of labeled training objects including the additional labeled training object.

2. The method of claim 1, wherein training the ML model comprises:
receiving the set of labeled training objects;
determining a list of features corresponding to the set of labeled training objects;
ranking the features in the list of features, thereby generating a ranked list of features;
augmenting the labeled training objects to include a subset of features in the ranked list of features; and
training the ML model using the augmented labeled training objects and the ML algorithm to generate the ML model.

3. The method of claim 2, wherein the subset of features comprises a number of highest-ranked features in the ranked list.

4. The method of claim 3, further comprising determining the number of highest-ranked features by determining a combination of features in the ranked list of features that maximizes a performance measure of the generated ML model.

5. The method of claim 1, wherein the generated ML model comprises a linear model.

6. The method of claim 1, further comprising causing display of the candidate training object.

7. The method of claim 6, further comprising causing display of an indication of the target channel.

8. A method of generating additional training objects for training a generated machine learning (ML) model of a gain for a target channel of a plurality of channels of an amplifier device, the generated ML model having been learned using a set of labeled training objects, each labeled training object of the set of labeled training objects comprising an indication of a channel loading for the amplifier device, and an indication of a gain for the target channel, the method comprising:
receiving a plurality of unlabeled training objects, each unlabeled training object comprising an indication of a channel loading for the amplifier device;
determining an additional labeled training object from the unlabeled training objects for further training the generated ML model, the determining comprising:
determining, based on a type of the generated ML model and the plurality of unlabeled training objects, a variance model;
determining a plurality of channel loadings for the variance model;
determining, using the variance model and the plurality of channel loadings, a plurality of variance parameters, wherein each variance parameter of the plurality of variance parameters corresponds to a channel loading of the plurality of channel loadings;
selecting, based on the plurality of variance parameters, a channel loading of the plurality of channel loadings;
determining, based on the selected channel loading, a candidate training object from the plurality of unlabeled training objects;
receiving a measured gain value for the target channel based on a channel loading indicated by the candidate training object; and
generating, based on the candidate training object and the measured gain value, an additional labeled training object; and
further training the generated ML model using the set of labeled training objects including the additional labeled training object.

9. The method of claim 8, wherein further training the generated ML model comprises:
receiving the set of labeled training objects;
determining a list of features corresponding to the set of labeled training objects;
removing one or more features in the list of features;
generating a ranked list of features by ranking the features in the list of features; and
generating the ML model using an amount of highest-ranked features in the ranked list.

10. The method of claim 8, further comprising transmitting, to a device configured to measure one or more gain values of the amplifier device, the candidate training object.

11. The method of claim 8, wherein the generated ML model comprises a quadratic model.

12. The method of claim 8, wherein the generated ML model comprises one or more tree models.

13. The method of claim 8, wherein determining the plurality of channel loadings comprises determining a set of all possible channel loadings for the variance model.

14. The method of claim 8, wherein determining the plurality of variance parameters comprises, for each channel loading of the plurality of channel loadings:
determining a plurality of predicted gain values corresponding to the respective channel loading; and
determining an empirical variance of the plurality of predicted gain values.

15. The method of claim 14, wherein determining the plurality of predicted gain values comprises determining the output of each tree of a plurality of trees.

* * * * *